United States Patent
Mochizuki et al.

(10) Patent No.: US 8,984,435 B2
(45) Date of Patent: Mar. 17, 2015

(54) PRINT CONTROL APPARATUS AND PRINT CONTROL METHOD

(75) Inventors: Yasushi Mochizuki, Zushi (JP); Masakazu Nomoto, Yokohama (JP); Keisuke Nagao, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 848 days.

(21) Appl. No.: 11/454,898

(22) Filed: Jun. 19, 2006

(65) Prior Publication Data

US 2006/0287974 A1 Dec. 21, 2006

(30) Foreign Application Priority Data

Jun. 20, 2005 (JP) .................................. 2005-179648

(51) Int. Cl.
*G06F 3/048* (2013.01)
*G06F 17/30* (2006.01)

(52) U.S. Cl.
CPC .............................. *G06F 17/30067* (2013.01)
USPC ........................... 715/783; 715/713; 715/764

(58) Field of Classification Search
USPC ............. 707/1; 715/783, 738, 762, 713, 781, 715/739; 358/1.1
See application file for complete search history.

(56) References Cited

U.S. PATENT DOCUMENTS

| | | | | |
|---|---|---|---|---|
| 6,601,067 B1 * | 7/2003 | Hiyoshi | ................................ | 1/1 |
| 6,701,308 B1 * | 3/2004 | Chen et al. | ........................ | 707/3 |
| 6,978,096 B2 * | 12/2005 | Maeshima | ...................... | 399/82 |
| 7,162,488 B2 * | 1/2007 | DeVorchik et al. | ................... | 1/1 |
| 7,277,192 B2 | 10/2007 | Kotani | | |
| 7,286,255 B2 * | 10/2007 | Habuta et al. | ................. | 358/1.15 |
| 7,533,116 B2 * | 5/2009 | Lacy | ..................................... | 1/1 |
| 7,698,650 B2 * | 4/2010 | Holmes | ........................ | 715/762 |
| 2003/0147097 A1 * | 8/2003 | Kotani et al. | ................. | 358/1.18 |
| 2006/0031263 A1 * | 2/2006 | Arrouye et al. | ............... | 707/200 |
| 2006/0098105 A1 * | 5/2006 | Okisu et al. | .............. | 348/231.99 |

FOREIGN PATENT DOCUMENTS

| | | |
|---|---|---|
| JP | 10-154091 A | 6/1998 |
| JP | 2000056937 | 2/2000 |
| JP | 2001-109080 A | 4/2001 |
| JP | 2002-209073 A | 7/2002 |
| JP | 2003-231323 A | 8/2003 |
| JP | 2005-038308 A | 2/2005 |

OTHER PUBLICATIONS

Japanese Office Action dated Jan. 25, 2010 concerning the Japanese Patent Application No. 2005-179648.
Japanese Office Action dated Oct. 12, 2010 concerning Japanese Patent Application No. 2005-179648.

* cited by examiner

*Primary Examiner* — Omar Abdul-Ali
*Assistant Examiner* — Sherrod Keaton
(74) *Attorney, Agent, or Firm* — Fitzpatrick, Cella, Harper & Scinto

(57) ABSTRACT

Selected data files in folders are sorted in a designated order for each of folders that store selected data files (S204), and information associated with each of the selected data folders sorted for each folder is registered in a page list in the designated folder order (S205).

11 Claims, 21 Drawing Sheets

FIG. 9

| CHILDREN 1 | CHILDREN 2 | CHILDREN 3 | CHILDREN 4 | | |
| --- | --- | --- | --- | --- | --- |
| IMG_0003.jpg | IMG_0007.jpg | IMG_0010.jpg | IMG_0011.jpg | | |
| DOG 1 | DOG 2 | DOG 3 | DOG 4 | DOG 5 | |
| IMG_0001.jpg | IMG_0004.jpg | IMG_0005.jpg | IMG_0012.jpg | IMG_0014.jpg | |
| CAT 1 | CAT 2 | CAT 3 | CAT 4 | CAT 5 | CAT 6 |
| IMG_0002.jpg | IMG_0006.jpg | IMG_0008.jpg | IMG_0009.jpg | IMG_0013.jpg | IMG_0015.jpg |

F I G. 11

12019

| CHILDREN 1 | CHILDREN 2 | CHILDREN 3 | CHILDREN 4 |
|---|---|---|---|
| IMG_0003.jpg | IMG_0007.jpg | IMG_0010.jpg | IMG_0011.jpg |

12020

| DOG 1 | DOG 2 | DOG 3 | DOG 4 | DOG 5 |
|---|---|---|---|---|
| IMG_0001.jpg | IMG_0004.jpg | IMG_0005.jpg | IMG_0012.jpg | IMG_0014.jpg |

12021

| CAT 1 | CAT 2 | CAT 3 | CAT 4 | CAT 5 | CAT 6 |
|---|---|---|---|---|---|
| IMG_0002.jpg | IMG_0006.jpg | IMG_0008.jpg | IMG_0009.jpg | IMG_0013.jpg | IMG_0015.jpg |

FIG. 12

FOLDER LIST 3000

| FOLDER NAME 3001 | LINK TO FILE LIST 3002 |
|---|---|
| C:¥User1¥Pictures¥CCC | (ADDRESS OF FILE LIST 1) |
| C:¥User1¥Pictures¥AAA | (ADDRESS OF FILE LIST 2) |
| C:¥User1¥Pictures¥BBB | 0 |
| C:¥User1¥Documents¥EEE | (ADDRESS OF FILE LIST 3) |
| C:¥User1¥Documents¥DDD | 0 |

FILE LIST 1 — 4000, 4001, 4002

| FILE NAME | PRINT COUNT |
|---|---|
| IMG_0001.JPG | 3 |
| IMG_0004.JPG | 1 |
| IMG_0007.JPG | 2 |
| IMG_0009.JPG | 1 |
| IMG_0012.JPG | 1 |
| IMG_0015.JPG | 1 |

FILE LIST 2 — 4010, 4011, 4012

| FILE NAME | PRINT COUNT |
|---|---|
| IMG_0102.JPG | 2 |
| IMG_0104.JPG | 1 |
| IMG_0105.JPG | 1 |

FILE LIST 3 — 4020, 4021, 4022

| FILE NAME | PRINT COUNT |
|---|---|
| IMG_1001.JPG | 1 |
| IMG_1002.JPG | 1 |
| IMG_1003.JPG | 1 |

FIG. 18

| DOG 1 | CAT 1 | CHILDREN 1 | DOG 2 | DOG 3 | CAT 2 |
|---|---|---|---|---|---|
| IMG_0001.jpg | IMG_0002.jpg | IMG_0003.jpg | IMG_0004.jpg | IMG_0005.jpg | IMG_0006.jpg |

| CHILDREN 2 | CAT 3 | CAT 4 | CHILDREN 3 | CHILDREN 4 | DOG 4 |
|---|---|---|---|---|---|
| IMG_0007.jpg | IMG_0008.jpg | IMG_0009.jpg | IMG_0010.jpg | IMG_0011.jpg | IMG_0012 |

| CAT 5 | DOG 5 | CAT 6 |
|---|---|---|
| IMG_0013.jpg | IMG_0014.jpg | IMG_0015.jpg |

PRINT CONTROL APPARATUS AND PRINT CONTROL METHOD

FIELD OF THE INVENTION

The present invention relates to a print control technique and, more particularly, to a technique for selecting a data file to be printed and printing it on a user interface.

BACKGROUND OF THE INVENTION

A conventional print control apparatus can set a print order such as "name order", "date & time order", "selection order", and the like upon printing data files such as image data and the like (for example, see Japanese Patent Laid-Open No. 2000-56937).

When data to be printed are selected from data files distributed in a plurality of folders, the print order is applied to all selected images irrespective of the folders that store the selected images.

FIG. 17 illustrates an example of folders in a hard disk (HDD) of a computer and image files included in these folders. In the HDD, an "A" folder 11001, "B" folder 11002, and "C" folder 11003 are assured, and store image files which are classified in correspondence with the types of objects. In FIG. 17, the "A" folder 11001 stores four files associated with "child" including an image file 11004 with a file name "IMG_0003.jpg". Likewise, the "B" folder 11002 stores image files associated with "pet dog", and the "C" folder 11003 stores image files associated with "pet cat". Individual image files have various file names and photographing dates and times.

Upon selecting and printing all images of these folders, the print order is applied to all the images in the conventional method. For example, when index print is made in the "name order", images are printed, as shown in FIG. 18. Even though image files are classified in correspondence with the types of objects, images are printed while they are mixed.

SUMMARY OF THE INVENTION

The present invention has been made in consideration of the aforementioned problems, and has as its object to provide a technique for applying the print order to data files in each of folders in place of applying the print order to all selected data files upon simultaneously printing data files distributed in a plurality of folders.

The operability can be improved by providing means that allows the user to select whether the print order is applied to each folder or to all data files.

The present invention provides a technique which can improve the appearance of the print result by providing means that can insert another data such as line feed, page break, image, or the like between neighboring folders when the print order is controlled for each folder.

In order to achieve an object of the present invention, for example, a print control apparatus of the present invention comprises the following arrangement.

That is, a print control apparatus for processing data files stored in a plurality of folders stored in a storage medium, characterized by comprising:

window display means for displaying a window having a folder list display area that displays a folder list, and a file list display area that displays a file list of files stored in a selected folder;

storage means for, when a folder is designated newly in the folder list display area by designation means, setting the designated folder as a selected folder, and for, when a data file to be printed in the selected folder is newly designated by the designation means, storing information used to specify the designated data file in the file list in association with the selected folder; and registration means for registering information, which is used to sort and print selected data files in folders in a predetermined order for each folder that stores the selected data files, in a page list based on the information stored in the storage means.

In order to achieve an object of the present invention, for example, a print control method of the present invention comprises the following arrangement.

That is, a print control method to be executed by a print control apparatus for processing data files stored in a plurality of folders stored in a storage medium, characterized by comprising:

a window display step of displaying a window having a folder list display area that displays a folder list, and a file list display area that displays a file list of files stored in a selected folder;

a storage step of setting, when a folder is designated newly in the folder list display area by designation means, the designated folder as a selected folder, and storing, when a data file to be printed in the selected folder is newly designated by the designation means, information used to specify the designated data file in the file list in association with the selected folder; and a registration step of registering information, which is used to sort and print selected data files in folders in a predetermined order for each folder that stores the selected data files, in a page list based on the information stored in the storage step.

In order to achieve an object of the present invention, for example, a print control apparatus of the present invention comprises the following arrangement.

That is, a print control apparatus for processing data files stored in a plurality of folders stored in a storage medium, characterized by comprising:

display control means for controlling a display device to display a folder list display area that displays a folder list, and a file list display area that displays a file list of files stored in a selected folder;

storage means for, when a folder-is designated newly in the folder list display area by designation means, setting the designated folder as a-selected folder, and for, when a data file is newly designated by the designation means in the selected folder, storing information used to specify the designated data file in association with the selected folder; and layout means for laying out, based on the information stored in the storage means, selected data files in folders on a single paper sheet in a predetermined order for each folder that stores the selected data files.

In order to achieve an object of the present invention, for example, a print control method of the present invention comprises the following arrangement.

That is, a print control method to be executed by a print control apparatus for processing data files stored in a plurality of folders stored in a storage medium, characterized by comprising:

a display control step of controlling a display device to display a folder list display area that displays a folder list, and a file list display area that displays a file list of files stored in a selected folder;

a storage step of setting, when a folder is designated newly in the folder list display area by designation means, the designated folder as a selected folder, and of storing, when a data file is newly designated by the designation means in the selected folder, information used to specify the designated data file in association with the selected folder; and a layout step of laying out, based on the information stored in the storage step, selected data files in folders on a single paper sheet in a predetermined order for each folder that stores the selected data files.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 shows an output example when line feed data is inserted as a folder delimiter;

FIG. 11 shows an output example when page break data is inserted as a folder delimiter;

FIG. 12 shows an example of a folder list;

FIG. 13 shows an example of file lists;

FIG. 18 shows a print result when images held by respective folders exemplified in FIG. 17 are printed by a method of unchecking a check box "sort images for each folder";

DETAILED DESCRIPTION OF THE PREFERRED EMBODIMENTS

Preferred embodiments of the present invention will now be described in detail in accordance with the accompanying drawings.

[First Embodiment]

Figure 1:
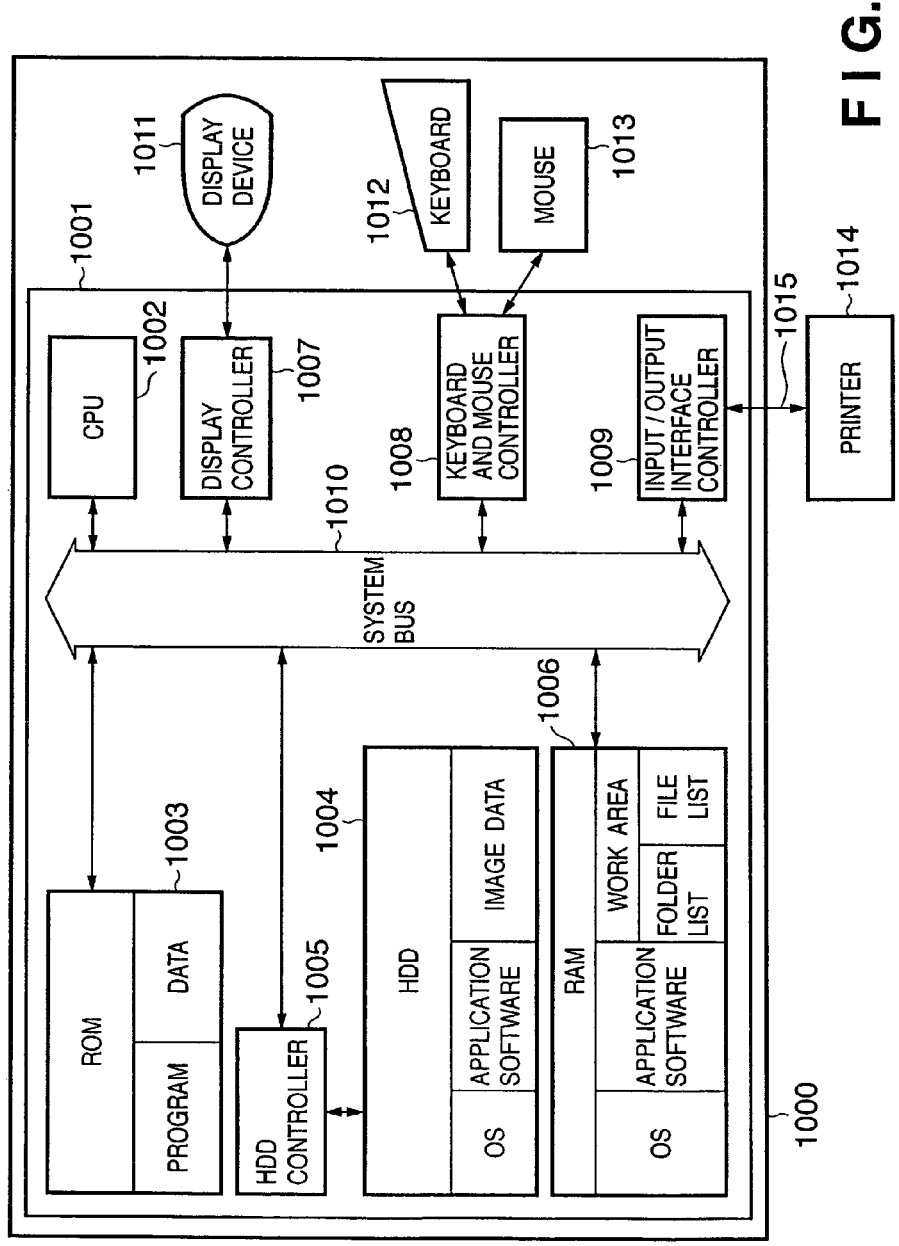
FIG. 1 is a schematic block diagram showing the hardware arrangement of an information processing apparatus 1000 which can be applied to a print control apparatus according to the first embodiment of the present invention.

FIG. 1 is a schematic block diagram showing the hardware arrangement of an information processing apparatus 1000 which can be applied to a print control apparatus according to this embodiment. In this embodiment, a computer such as a general PC (personal computer), WS (workstation), or the like is applied as this information processing apparatus 1000.

Referring to FIG. 1, the information processing apparatus 1000 as the print control apparatus according to this embodiment comprises an information processing apparatus main body 1001, CPU 1002, ROM 1003, hard disk drive (HDD) 1004, HDD controller 1005, RAM 1006, display controller 1007, keyboard and mouse controller 1008, input/output interface controller 1009, system bus 1010, display device 1011, keyboard 1012, and mouse 1013.

Of these components, the CPU 1002, ROM 1003, HDD 1004, HDD controller 1005, RAM 1006, display controller 1007, keyboard and mouse controller 1008, input/output interface controller 1009, and system bus 1010 are arranged inside the information processing apparatus main body 1001.

The CPU 1002 reads out and executes programs stored in the ROM 1003 or programs which are loaded from the HDD 1004 onto the RAM 1006 to control respective units in the information processing apparatus main body 1001, and to execute processing according to the flowcharts to be described later.

The ROM 1003 stores programs for controlling the controllers 1005, 1007, 1008, and 1009, a program for loading an OS (operating system) from the HDD 1004 onto the RAM 1006 and launching it, and data used upon execution of these programs.

The HDD 1004 stores the OS that operates the information processing apparatus 1000, print control application software which makes the information processing apparatus 1000 function as the print control apparatus, and image data corresponding to images to be printed by this application software.

Each individual software and data in the HDD 1004 are stored as files. Folders can be created in the HDD 1004, and each folder can include files and other folders. As a result, folders form a hierarchical structure in the HDD 1004, and files are allocated in these folder layers.

The HDD controller 1005 controls access to the HDD 1004.

Since the RAM 1006 loads the OS and print control application software stored in the HDD 1004 via the HDD controller 1005, it has areas for storing the loaded OS and software. Also, a work area used when the CPU 1002 executes each software is assured in the RAM 1006. In this work area, a folder list and file lists are created.

The display controller 1007 controls the display device 1011 that displays characters and images for the user of the information processing apparatus 1000 under the control of the CPU 1002.

The keyboard and mouse controller 1008 accepts inputs from the user of the information processing apparatus 1000 via the keyboard 1012 and the mouse 1013 as a pointing device (instruction means) under the control of the CPU 1002. Since the information processing apparatus 1000 comprises the display device 1011, keyboard 1012, and mouse 1013, the user of the information processing apparatus 1000 can make interactive operations with the information processing apparatus 1000.

The system bus 1010 interconnects respective units in the information processing apparatus main body 1001, and transfers various data.

A printer 1014 prints characters and images according to data having a specific format, which is input via an input/output interface 1015. The printer 1014 is connected to the input/output interface controller 1009 of the information processing apparatus 1000 via the input/output interface 1015. In this embodiment, assume that the printer 1014 is a color ink-jet printer. However, the present invention is not limited to such specific device as long as it can print images, and printers that use other print techniques such as a laser beam printer, thermoelectric printer, impact printer, and the like may be used. In this embodiment, assume that the input/output interface is USB (Universal Serial Bus). However, the present invention is not limited to such specific interface as long as it can implement exchange of data having the specific format. Hence, interfaces using other communication techniques such as IEEE (Institute of Electrical and Electronics Engineers) 1284, IEEE1394, IrDA (Infrared Data Association), IEEE802.11, 100BaseTX, and the like may be used.

In the above arrangement, in order to use the information processing apparatus 1000 as the print control apparatus, the print control application must be installed in the HDD 1004 of the information processing apparatus 1000. This installation suffices if it is done once, unless there is a special reason. When this print control application is loaded onto the RAM 1006, and the CPU 1002 executes the print control application, the information processing apparatus 1000 executes respective processes to be described later.

Figure 2:
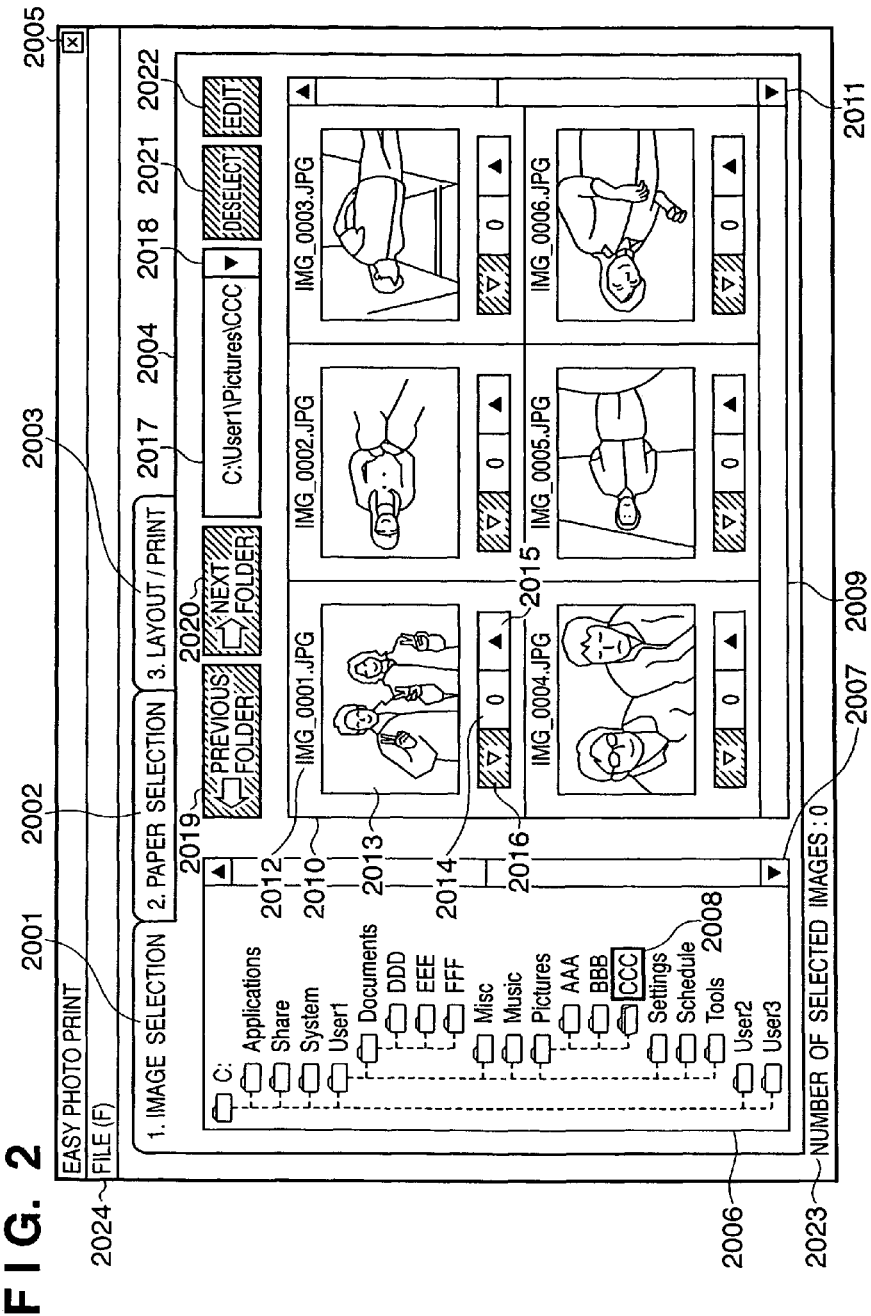
FIG. 2 shows a display example on a display device 1011 in a "multi-folder mode" by a print control application according to the first embodiment of the present invention.

FIG. 2 shows a display example on the display device 1011 in a "multi-folder mode" by the print control application according to this embodiment. Note that this print control application is executed by the CPU 1002, as described above. Also, GUIs (graphical user interfaces) which will appear in the following description are operated using the mouse 1013 unless otherwise specially touched upon in the following description.

Reference numerals 2001, 2002, and 2003 denote tab areas. When the user moves a mouse cursor into each tab area by operating the mouse 1013 and clicks a mouse button there, processing corresponding to that tab area is launched.

Reference numeral 2004 denotes a work area, the display contents of which are switched according to a job designated by selecting the tab. FIG. 2 shows a state wherein the first tab 2001 is selected, and the work area 2004 displays a work window used to select images to be printed by the print control apparatus according to this embodiment.

Reference numeral 2005 denotes a quit button. When the user moves the mouse cursor to the position of this quit button 2005 by operating the mouse 1013 and clicks the mouse button there, the print control application quits.

Reference numeral 2023 denotes a selected image count display area. The selected image count display area 2023 displays the total number of all images to be printed designated by user operations to thumbnail frames 2010 (to be described later).

Reference numeral 2024 denotes a "file" menu. When the user moves the mouse cursor to the position of this "file" menu 2024 by operating the mouse 1013 and clicks the mouse button there, a drop-down menu having two options "setting" and "quit" is displayed. When the user moves the mouse cursor to the "quit" position in this menu by operating the mouse 1013 and clicks the mouse button there, the print control application quits as in the case of selection of the quit button 2005. On the other hand, when the user moves the mouse cursor to the "setting" position in this menu by operating the mouse 1013 and clicks the mouse button there, a "setting" dialog is opened to provide setting functions associated with the entire print control application to the user.

Figure 6:
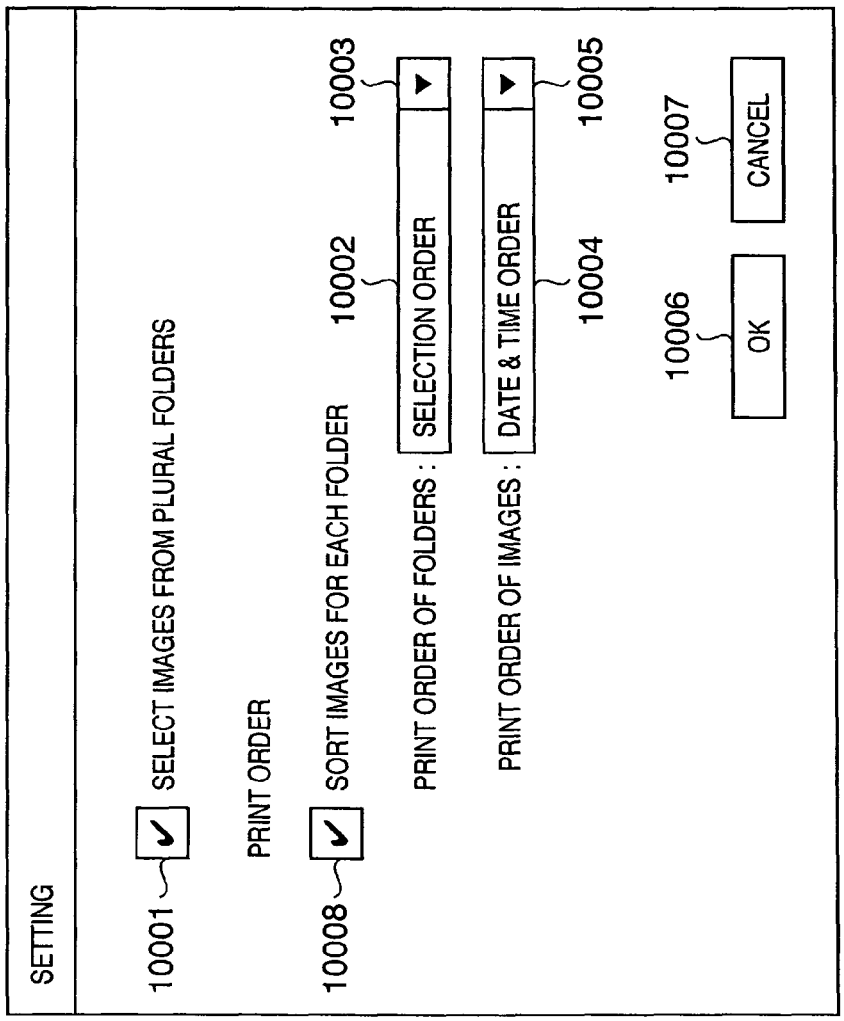
FIG. 6 shows a display example of a "setting" dialog.

FIG. 6 shows a display example of the "setting" dialog.

The print control application of this embodiment has a "single-folder mode" which allows the user to select images from a single folder, and a "multi-folder mode" which allows the user to select images from a plurality of folders. The user can designate in which of the modes the print control application runs by operating a mode setting check box 10001.

Every time the user moves the mouse cursor to the position of the mode setting check box 10001 by operating the mouse 1013 and clicks the mouse button there, the mode setting check box 10001 is selectively displayed between a checked state and unchecked state.

When the mode setting check box 10001 is in the checked state, i.e., when the "multi-folder mode" is set, the print control application processes image files designated as images to be printed in each folder which includes these image files. In the "single-folder mode", images to be printed can be selected in only a given folder, and image data in other folders cannot be simultaneously designated as images to be printed.

On the other hand, in the "multi-folder mode", folders which include designated images are sorted according to predetermined rules, and image files included each folder are sorted according to predetermined rules. Then, image files are printed according to the order of these sorting results.

Reference numeral 10008 denotes a check box used to switch whether the print order is applied to only selected image files in each folder, or all selected image files are sorted in the setting order regardless of folders, when image files in a plurality of different folders are selected and are printed according to the set print order. When this check box is enabled, a setting about 10002 is allowed.

Reference numeral 10002 denotes a print order display field of folders, which display predetermined rules upon sorting folders. When the user moves the mouse cursor to the position of a drop-down button 10003 by operating the mouse 1013 and clicks the mouse button there, a drop-down menu of options is displayed. When the user moves the mouse cursor to the position of one of the displayed options by operating the mouse 1013 and clicks the mouse button there, the print order display field 10002 of folders is updated to the designated option.

As the options of this field, three different orders, i.e., "date & time order", "name order", and "selection order" are displayed. In the "date & time order", the dates and times of creation of folders which include selected image files are acquired from the HDD 1004, and the folders are sorted in ascending order of acquired date and time. In the "name order", full-path name character strings of respective folders are sorted in the order of character codes. In the "selected order", the order in which the user selected image files in the folders as images to be printed is adapted intact as the print order for each folder. The default value of the print order display field 10002 of folders is "selection order". The setting value in the print order display field 10002 of folders is not used in the "single-folder mode".

Reference numeral 10004 denotes a print order display field of selected image files, which displays predetermined rules used upon sorting selected image files in each individual folder. When the user moves the mouse cursor to the position of a drop-down button 10005 by operating the mouse 1013 and clicks the mouse button there, a drop-down menu of options is displayed. When the user moves the mouse cursor to the position of one of the displayed options by operating the mouse 1013 and clicks the mouse button there, the print order display field 10004 of images is updated to the designated option.

As the options of this field, three different orders, i.e., "date & time order", "name order", and "selection order" are also displayed. In the "date & time order", the photographing dates and times of images recorded as Exif (Exchangeable image file format) information in individual selected image files are acquired, and selected image files are sorted in ascending order of date and time. In the "name order", file name character strings of selected image files are sorted in the order of character codes. In the "selection order", the order in which the user set individual selected image files as images to be printed is adopted. The default value of the print order display field 10004 of images is the "date & time order". The image print order in the "single-folder mode" follows the setting value of the print order display field 10004 of images.

Reference numeral 10006 denotes an "OK" button. When the user moves the mouse cursor to the position of this "OK" button 10006 by operating the mouse 1013 and clicks the mouse button there, the display contents of the mode setting check box 10001, the print order display field 10002 of folders, and the print order display field 10004 of images at that time are settled as the current settings, and the "setting" dialog in FIG. 6 is closed, thus returning to the window shown in FIG. 2.

Reference numeral 10007 denotes a "cancel" button. When the user moves the mouse cursor to the position of this "cancel" button 10007 by operating the mouse 1013 and clicks the mouse button there, the settings or changes on the "setting" dialog in FIG. 6 are invalidated, and the "setting" dialog in FIG. 6 is closed, thus returning to the window shown in FIG. 2.

When the user does not open the "setting" dialog, settings upon previous execution of the print control application are applied. If the print control application has not been executed yet, and the "setting dialog" has not been opened, the default setting values are applied.

Figure 3:
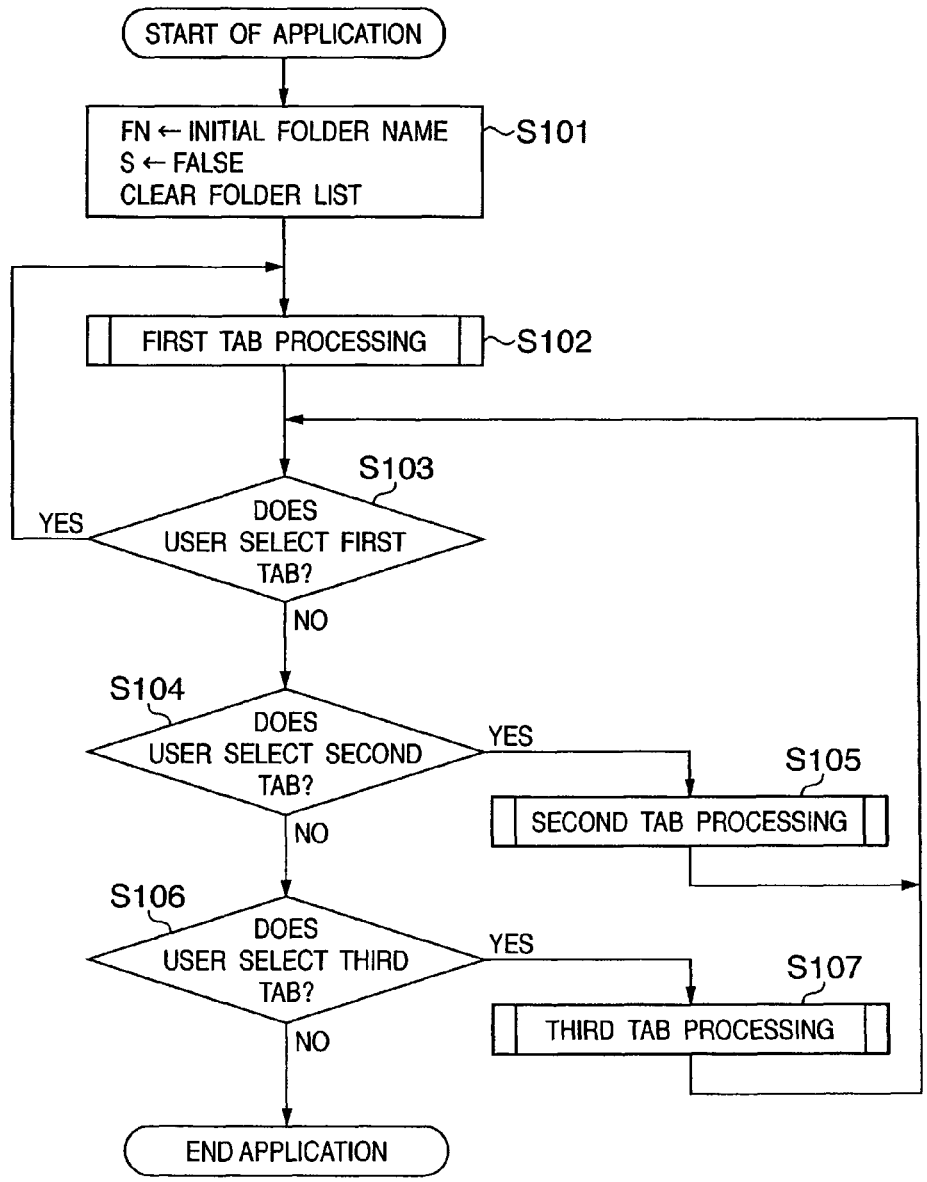
FIG. 3 is a flowchart showing the processing operation of the print control application.

The processing sequence of the overall operation of the print control apparatus will be described below using FIG. 3. FIG. 3 is a flowchart showing the processing operation of the print control application. When the print control application in the HDD 1004 is loaded onto the RAM 1006, and execution by the CPU 1002 starts, processing from step S101 is executed.

In step S101, initialization processing of the print control application is executed. Initially, in step S101 an initial folder name is stored in a character string variable FN. The initial folder name is a full-path name character string of a folder in the HDD 1004, and is the name of a folder which is referred to upon launching the print control application. More specifically, the initial folder name is a folder name which was referred to upon previous execution of the print control application. If there is no record upon previous execution, the name of a top-level folder of the folder layers in the HDD 1004 is used. Also, FALSE is stored in a flag variable S. The flag variable S indicates one or more image files in the folder with the name stored in the character string variable FN in the HDD 1004 are set to be printed. In order to set to print none of images immediately after the print control application is launched, the FALSE value is set.

In step S101, a folder list managed by this application is further cleared.

FIG. 12 shows an example of this folder list. A folder list 3000 is a list of a table format which includes pairs of folder names 3001 and links 3002 to file lists, as shown in FIG. 12, and is created in the work area of the RAM 1006. The folder list 3000 records data about a folder in the HDD 1004, which includes image files selected by the user of the print control application as images to be printed. Note that the folder list 3000 records data about a maximum of 100 folders. However, the present invention is not limited to this number of folders.

The folder name 3001 is a full-path character string of each folder in the HDD 1004. The link 3002 to a file list is reference information (pointer) to a file list to be described later, and records the start address of a field where the file list is stored in the work area of the RAM 1006. If no file list corresponding to the folder name 3001 exists, "0" is recorded, as indicated by 3003 in FIG. 12, as information indicating that no reference destination list exists.

FIG. 13 shows an example of the file lists. A file list 4000 is a list of a table format which includes pairs of file names 4001 and print counts 4002, as shown in FIG. 13, and is created in the work area of the RAM 1006. This file list 4000 corresponds to each row of the folder list 3000, and records a print count set for an image file selected by the user of the print control application as an image to be printed. In the file list 4000, only an image file for which a value "1" or more is set as its print count is registered, and an image file whose print count is set to "0" is not registered.

The file name 4001 in the file list 4000 is a file name character string of an image file which is stored in a folder in the HDD 1004 designated by the folder name 30001 recorded in the folder list 3000 in association with the file list 4000. The print count 4002 is a value designated by the user in first tab processing (to be described later) as the number of copies to be printed of an image file designated by the corresponding file name 4001.

Other file lists 4010 and 4020 adopt the same configuration as that of the file list 4000.

In step S101 in FIG. 3, since the folder list 3000 is cleared, the folder list 3000 becomes an empty list having no data. At this time, no file list exists.

Referring back to FIG. 3, in step S102 after step S101, the first tab processing (to be described later) is executed. The first tab processing in step S102 ends when the tab area 2001, 2002, or 2003 or the quit button 2005 in FIG. 2 is clicked, and the flow advances to step S103.

It is checked in step S103 if the user has made an operation for selecting the first tab. More specifically, when the user places the mouse cursor at the position of the tab area 2001 in FIG. 2 by operating the mouse 1013, and then clicks the mouse button, it is determined that the first tab 2001 is selected. If the user selects the first tab, the flow returns to step S102 to repeat the first tab processing.

If it is determined in step S103 that the user operation is not selection of the first tab, the flow advances to step S104 to check if the user has made an operation for selecting the second tab. More specifically, when the user places the mouse cursor at the position of the tab area 2002 in FIG. 2 by operating the mouse 1013., and then clicks the mouse button, it is determined that the second tab 2002 is selected. If the user selects the second tab, the flow advances to step S105 to execute second tab processing (to be described later). The second tab processing in step S105 ends when the tab area 2001, 2002, or 2003 or the quit button 2005 in FIG. 2 is clicked. After that, the flow returns to step S103 to repeat to check a user operation.

If it is determined in step S104 that the user operation is not selection of the second tab, the flow advances to step S106 to check if the user has made an operation for selecting the third tab. More specifically, when the user places the mouse cursor at the position of the tab area 2003 in FIG. 2 by operating the mouse 1013, and then clicks the mouse button, it is determined that the third tab 2003 is selected. If the user selects the third tab, the flow advances to step S107 to execute third tab processing (to be described later). The third tab processing in step S107 ends when the tab area 2001, 2002, or 2003 or the quit button 2005 in FIG. 2 is clicked. After that, the flow returns to step S103 to repeat to check a user operation.

It is determined in step S106 that the user operation is not selection of the third tab when the user places the mouse cursor at the position of the quit button 2005 by operating the mouse 2013 and then clicks the mouse cursor. Therefore, it is determined that the user has made an application quit operation, thus quitting the operation of the print control application.

Referring back to FIG. 2, display-of the work area 2004 used in the first tab processing in the "multi-folder mode" will be described below.

Reference numeral 2006 denotes a folder tree display area, which displays folders that form the hierarchical structure in the HDD 1004 in a tree format. A folder icon indicates each individual folder, and the name of a folder is presented on the right side of the icon using a character string. "C:" at the top level position indicates a top-level folder in the HDD 1004, and includes folders named "Applications", "Share", and the like. A folder "User1" in the top-level folder further includes a folder "Documents" and the like. When the contents to be displayed in the folder tree display area 2006 cannot fall within the display range, scroll display is made in the up-and-down direction. The display contents in the folder tree display area 2006 are scrolled according to an operation of a scroll bar 2007 via the mouse 1013 by the user.

In the folder tree display area 2006, reference numeral 2008 denotes a currently selected folder, whose full-path name is designated by the character string variable FN. In the example of FIG. 2, a folder "C:¥User1¥Pictures¥CCC" is selected. The folder name "CCC" is bounded by a frame, and an icon which is changed to a shape indicating an open folder is displayed. In the folder tree display area 2006, one folder is always selected.

When the user moves the mouse cursor to the position of a folder other than the currently selected folder 2008 in the folder tree display area 2006 by operating the mouse 2013 and clicks the mouse button there, it is determined that the folder designated at that time is newly selected. Then, the display contents in the folder tree display area 2006 are updated, and the full-path name character string of this folder is stored in the character string variable FN. At the same time, the aforementioned folder list 3000 is updated, and the file list 4000 is created or updated, as needed.

Reference numeral 2009 denotes a thumbnail display area which displays zero or more thumbnail frames 2010. When the folder with the folder name FN, which is selected in the folder tree display area 2006, stores image files, thumbnail frames 2010 are displayed in an array (list) to have one-to-one correspondence with the image files. The display size of each thumbnail frame 2010 is constant independently of the number of image files in the selected folder. For this reason, when the number of image files in the selected folder is large, and all thumbnail frames cannot be displayed within the thumbnail display area 2009, scroll display is made in the up-and-down direction. The displayed contents in the thumbnail display area 2009 are scrolled in accordance with an operation of a scroll bar 2011 via the mouse 1013 by the user. If no image file is stored in the selected folder, the thumbnail display area 2009 is blank, and does not display any thumbnail frame.

The thumbnail frame corresponding to each individual image file has an equivalent configuration as follows.

In the thumbnail frame 2010, reference numeral 2012 denotes an image file name display field which displays the file name of an image file corresponding to the thumbnail frame 2010 as a character string. Reference numeral 2013 denotes a thumbnail display field which displays a thumbnail of an image stored in the image file corresponding to the thumbnail frame 2010. Reference numeral 2014 denotes a print count display field which displays the number of copies to be printed of the image file corresponding to the thumbnail frame 2010.

Reference numeral 2015 denotes a print count increment button. When the user places the mouse cursor at the position of this print count increment button 2015 by operating the mouse 1013, and then clicks the mouse button, the print count of an image corresponding to the thumbnail frame 2010 is incremented by one, and the display contents of the print count display field 2014 are updated.

Reference numeral 2016 denotes a print count decrement button. When the user places the mouse cursor at the position of this print count decrement button 2016 by operating the mouse 1013, and then clicks the mouse button, the print count of an image corresponding to the thumbnail frame 2010 is decremented by one, and the display contents of the print count display field 2014 are updated. Note that each hatched button in FIG. 2 is displayed in an inactive state, and no processing is made in response to a user operation.

The print count of each individual image is set to fall within the range from 0 to 99. Since the print count cannot be decremented any more while "0" is displayed on the print count display field 2014, the print count decrement button 2016 is displayed in an inactive state, as shown in FIG. 2. Also, since the print count cannot be incremented any more while "99" is displayed on the print count display field 2014, the print count increment button 2015 is displayed in an inactive state. If the numerical value in the print count display field 2014 falls within the range from 1 to 98, since the print count can be incremented and decremented, both the print count increment button 2015 and print count decrement button 2016 are displayed in an active state.

When the user selects a folder other than the currently selected folder FN while the print count of at least one image file is set to 1 or more in the thumbnail display area 2009, i.e., the folder FN includes at least one image file to be printed, a file list (the file list 4000 in the format exemplified in FIG. 13) which registers all image files whose print count is set to 1 or more in the folder FN is created. Also, the folder FN is registered in the folder list 3000 in FIG. 12, and link information to the created file list is recorded.

At this time, when the folder FN is already registered in the folder list 3000, its redundant registration is avoided. Instead, the file list which already exists in the row of the folder FN that already exists in the folder list 3000 is updated by the current print count settings.

On the other hand, when the user selects a folder other than the currently selected folder FN while the folder FN is already registered in the folder list 3000 and the print counts of all image files are set to 0 in the thumbnail display area 2009, i.e., all print operations of image files in the folder already registered in the folder list 300 are canceled, the row of the folder FN itself which already exists in the folder list 3000 is not deleted, and only the link 3002 to the file list is cleared to a value "0" indicating that no file list exists. Then, the file list corresponding to the folder FN is deleted from the work area of the RAM 1006.

When the user selects a folder other than the currently selected folder. FN while the folder FN is already registered in the folder list 3000 but no corresponding file list exists, and the print count of at least one image file is set to 1 or more in the thumbnail display area 2009, a new file list is created, and link information to this file list is recorded in the row of the folder FN which already exists in the folder list 3000.

Reference numeral 2017 denotes a folder name display area which displays the full-path name of the folder 2008 currently selected in the folder tree display area 2006, i.e., the value of the character string variable FN as a character string. When the full-path name is longer than the width of the folder name display field 2017 and cannot be entirely displayed, it is displayed while omitting an intermediate part of the full-path name character string. The user can detect a rough position of the folder 2008 in the folder layers in the HDD 1004 with reference to the leading part of the full-path name character string, and the folder name of the folder 2008 with reference to the trailing part of the full-path character string.

Figure 14:
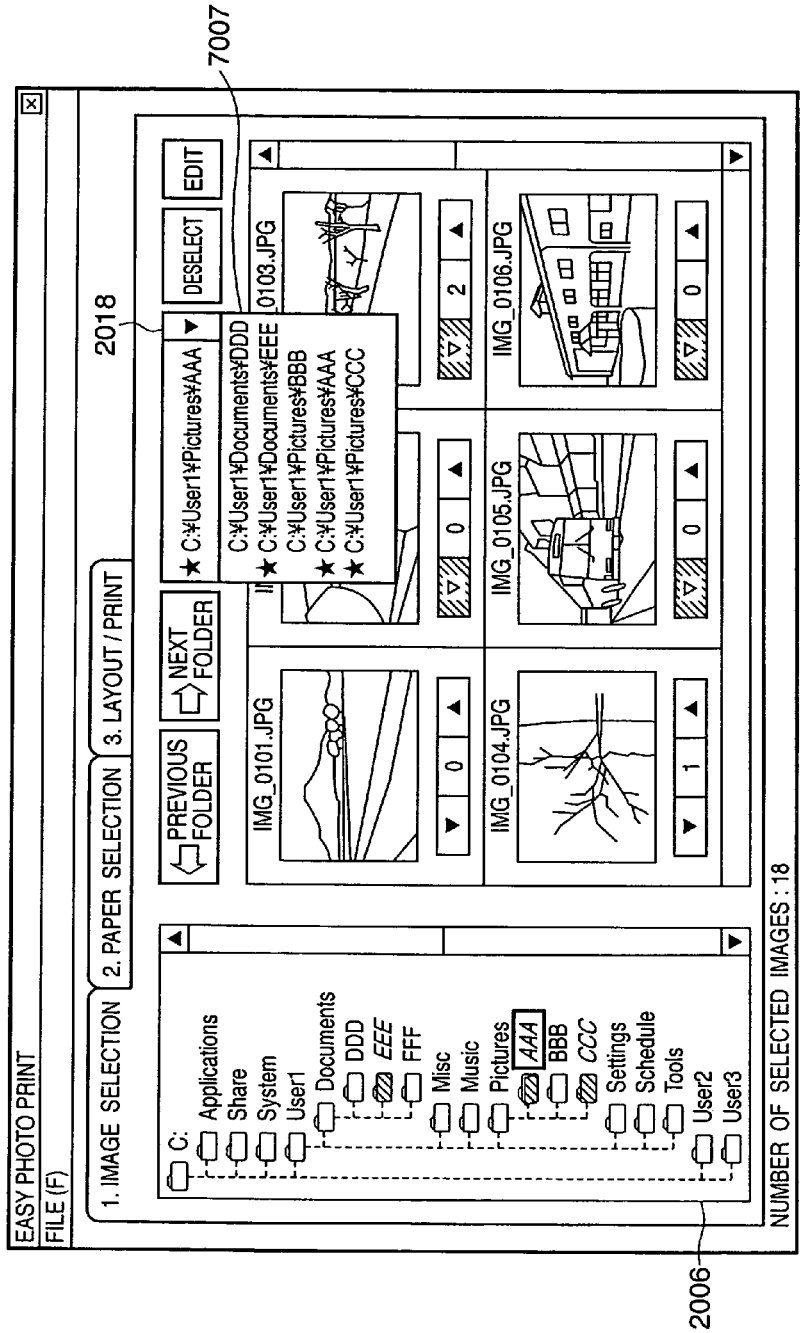
FIG. 14 shows a display example when a selected folder list is displayed.

Reference numeral 2018 denotes a selected folder list display button. When the user places the mouse cursor at the position of this selected folder list display button 2018 by operating the mouse 1013, and then clicks the mouse button, a selected folder list is displayed. The selected folder list displays a list of all folder names 3001 registered in the folder list 3000 exemplified in FIG. 12. The selected folder list displays the full-paths of the folder names 3001. FIG. 14 shows a display example on the display device 1011 when the selected folder list is displayed while the folder list 3000 has the contents shown in FIG. 12.

The full-path name of an oldest folder registered in the folder list 3000 is displayed at the lowermost position of a selected folder list 7007, and those of folders are displayed upward in turn in the order the folders were registered. The full-path name of a latest folder registered in the folder list 3000 is displayed at the uppermost position of the selected folder list 7007.

When the full-path name is longer than the width of the selected folder list 7007 and cannot be entirely displayed, it is displayed while omitting an intermediate part of the full-path name character string. The user can detect a rough position of a folder in the folder layers in the HDD 1004 with reference to the leading part of the full-path name character string, and the folder name of that folder with reference to the trailing part of the full-path character string.

When the user places the mouse cursor at the display position of any of folder names in this selected folder list 7007 by operating the mouse 1013, and then clicks the mouse button while the selected folder list 7007 is displayed, it is determined that the designated folder is newly selected, thus updating the display contents of the folder tree display area 2006. Also, the thumbnail display area 2009 is updated by thumbnail frames corresponding to image files in the newly selected folder.

Reference numeral 2019 denotes a "previous folder" button. When the user moves the mouse cursor to the position of this "previous folder" button 2019 by operating the mouse 1013, and clicks the mouse button there, it is determined that a folder registered immediately before the currently selected folder 2008 in the folder list 3000 is newly selected, thus updating the display contents of the folder tree display area 2006. Also, the thumbnail display area 2009 is updated by thumbnail frames corresponding to image files in the newly selected folder. Furthermore, the folder name display area 2017 and the value of the character string variable FN are also updated.

When the "previous folder" button 2019 is clicked while the currently selected folder 2008 is not registered in the folder list 3000, it is determined that the latest folder registered in the folder list 3000 is newly selected.

When no folder is registered in the folder list 3000, the "previous folder" button 2019 is displayed in an inactive state, and no processing is made in response to a user operation.

When the currently selected folder 2008 is a first folder registered in the folder list 3000, since no more previous folders exist in the folder list 3000, the "previous folder" button 2019 is displayed in an inactive state, and no processing is made in response to a user operation.

Reference numeral 2020 denotes a "next folder" button. When the user, moves the mouse cursor to the position of this "next folder" button 2020 by operating the mouse 1013, and clicks the mouse button there, it is determined that a folder registered immediately after the currently selected folder 2008 in the folder list 3000 is newly selected, thus updating the display contents of the folder tree display area 2006. Also, the thumbnail display area 2009 is updated by thumbnail frames corresponding to image files in the newly selected folder. Furthermore, the folder name display area 2017 and the value of the character string variable FN are also updated.

When the currently selected folder 2008 is not registered in the folder list 3000, the "next folder" button is displayed in an inactive state, and no processing is made in response to a user operation.

When the currently selected folder 2008 is a folder which is registered at the trailing end of the folder list, since no more next folders exist in the folder list 3000, the "next folder" button 2020 is displayed in an inactive state, and no processing is made in response to a user operation.

Reference numeral 2021 denotes a "deselect" button. When the user moves the mouse cursor to the position of this "deselect" button 2021 by operating the mouse 1013, and clicks the mouse button there, a "deselect folder" dialog used to unregister a folder from the folder list 3000 in FIG. 12 is displayed on the display device 1011. If no folder is registered in the folder list 3000, the "deselect" button is displayed in an inactive state, and no processing is made in response to a user operation.

Reference numeral 2022 denotes an "edit" button. When the user moves the mouse cursor to the position of this "edit" button 2022 by operating the mouse 1013, and clicks the mouse button there, an "edit selected folder" dialog used to edit the selected folder in the folder list 3000 in FIG. 12 is displayed on the display device 1011. If no folder is registered in the folder list 3000, the "edit" button is displayed in an inactive state, and no processing is made in response to a user operation.

The processing of the second tab 2002 will be described below with reference to FIG. 15.

Figure 15:
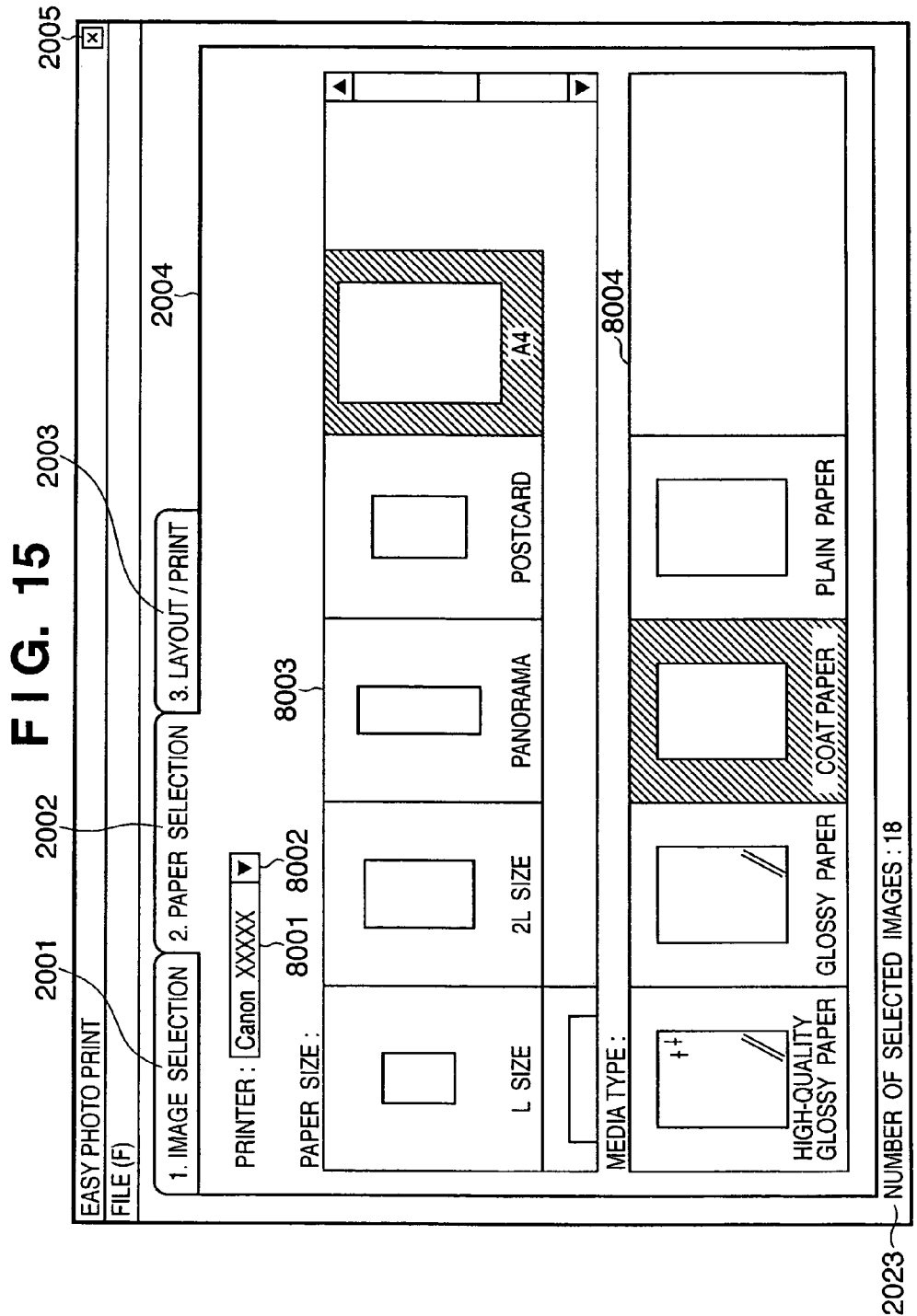
FIG. 15 shows a display example on the display device 1011 upon processing of a second tab 2002 by the print control application according to the first embodiment of the present invention.

FIG. 15 shows a display example on the display device 1011 upon processing of the second tab 2002 by the print control application of this embodiment.

When the user places the mouse cursor at the position of the second tab 2002 by operating the mouse 1013 and clicks the mouse button there, a window shown in FIG. 15 is displayed. The following processing operation corresponds to the second tab processing executed in step S105 in the flowchart of FIG. 3.

In the second tab processing, the tab area 2002 of the second tab is displayed in a selected state, and the display contents of the work area 2004 are switched to those for the second tab.

Reference numeral 8001 denotes a printer name display field, which displays the name of the printer 1014 connected to the information processing apparatus 1000 via the input/output interface 1015. When a plurality of printers are connected to the information processing apparatus 1000, a drop-down list of printer names is displayed when the user places the mouse cursor at the position of a printer list display button 8002 by operating the mouse 1013 and clicks the mouse button there. When the user places the mouse cursor at the position of any of the printer name list by operating the mouse 1013 and clicks the mouse button there, the designated printer is newly selected, and the name of the designated printer is displayed in the printer name display field 8001.

A paper size display area 8003 displays a list of paper sizes which are available for the printer currently displayed in the printer name display field 8001. Each paper size is displayed as a pair of paper icon and size name character string to be easily understandable by the user. Of these paper sizes, the currently selected paper size is highlighted by cross-hatching. In FIG. 15, an "A4" size is selected.

When the user designates one of the paper sizes from the paper size display area 8003, and clicks the button of the mouse 1013, it is determined that the designated paper size is selected, thus displaying the display contents. When the printer in the printer name display field 8001 is changed, the paper size display area 8003 is updated to a list of paper sizes which are available for the newly selected printer.

A media type display area 8004 displays a list of media types which are available for the printer currently displayed in the printer name display field 8001 and for the paper size currently selected on the paper size display area 8003. Each media type is displayed as a pair of a media icon and type name character string to be easily understandable by the user. Of these media types, the currently selected media type is highlighted by cross-hatching. In FIG. 15, "coat paper" is selected.

When the user designates one of the media types in the media type display area 8004 and clicks the button of the mouse 1013, it is determined that the designated media type is selected, thus updating the display contents. When the printer in the printer name display field 8001 is changed, the media type display area 8004 is updated to a list of media types which are available for the newly selected printer, and for the paper size currently selected in the paper size display area 8003. Also, when the paper size selected on the paper size display area 8003 is changed, the media type display area 8004 is updated to a list of media types which are available for the selected printer, and for the paper size newly selected in the paper size display area 8003.

The selected image count display area 2023 displays the total number of image files which are designated as images to be printed in the first tab processing.

During the second tab processing, when the user designates the tab area 2001 or 2003 of another tab, or the quit button 2005 and clicks the button of the mouse 1013, the second tab processing, i.e., the processing in step S105 in FIG. 3 ends.

The processing of the third tab 2003 will be described below with reference to FIG. 16.

Figure 16:
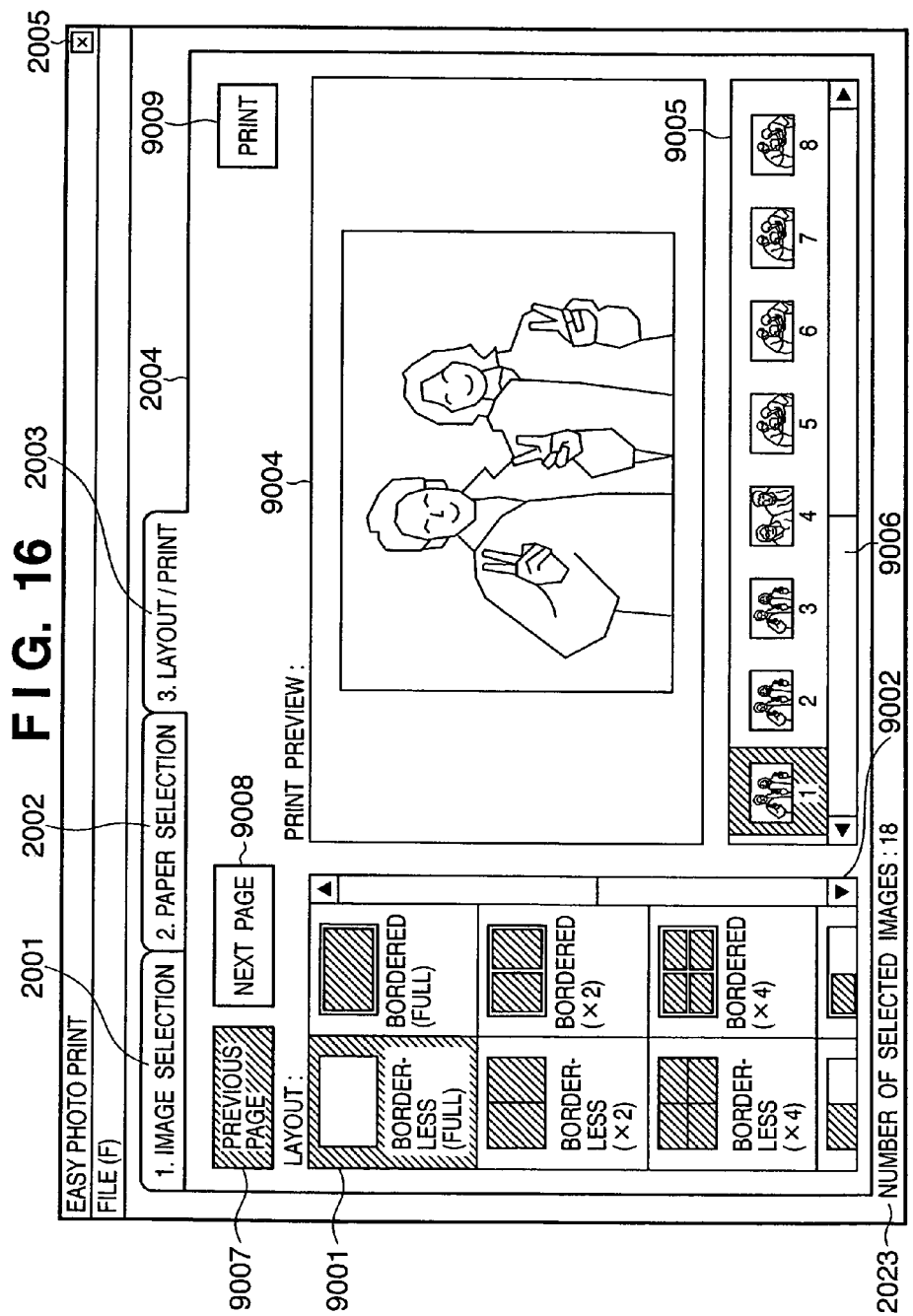
FIG. 16 shows a display example on the display device 1011 upon processing of a third tab by the print control application according to the first embodiment of the present invention.

FIG. 16 shows a display example on the display device 1011 upon processing of the third tab 2003 by the print control application of this embodiment. When the user places the mouse cursor at the position of the third tab 2003 by operating the mouse 1013 and clicks the mouse button there, a window shown in FIG. 16 is displayed. The following processing operation corresponds to the third tab processing executed in step S107 in the flowchart of FIG. 3.

In the third tab processing, the tab area 2003 of the third tab is displayed in a selected state,.and the display contents of the work area 2004 are switched to those for the third tab.

Reference numeral 9001 denotes a layout display area, which displays a list of layout types which can be designated for the printer displayed in the printer name display field 8001 on the second tab, the paper size selected in the paper size display area 8003, and the media type selected in the media type display area 8004. Each layout type is displayed as a pair of a layout icon and layout name character string to be easily understandable by the user. Of these layout types, the currently selected layout is highlighted by cross-hatching. In FIG. 16, a "borderless (full)" layout is selected. When many layout types must be displayed as a list and cannot fall within the layout display area 9001, scroll display is made in the up-and-down direction. The display contents of the layout display area 9001 are scrolled in accordance with an operation of a scroll bar 9002 via the mouse 1013 by the user.

Some printer models cannot perform borderless full-frame printing, and even a printer model which can perform borderless full-frame printing cannot often actually perform borderless full-frame printing depending on paper sizes. Furthermore, even a combination of a printer model and paper size that allow borderless full-frame printing may or may not be able to perform borderless full-frame printing depending on media types. Also, some layouts are not suited for application depending on paper sizes (e.g., a layout for fitting 100 images into a credit card size as a small paper size). For this reason, at the beginning of the third tab processing, layouts displayed as a list in the layout display area 9001 are changed depending on the displayed and selected contents of the printer name display field 8001, paper size display area 8003, and media type display area 8004 on the second tab.

Reference numeral 9004 denotes a print preview display area. The print preview display area 9004 displays a preview of the output result when each of image files designated as images to be printed on the first tab is to be printed in the print order displayed in the print order display field 10002 of folders and the print order display field 10004 of images in FIG. 6 in accordance with the settings made in the printer name display field 8001, paper size display area 8003, media type display area 8004, and layout display area 9001. The print preview display area 9004 displays the entire preview of an image or images to be printed on one paper sheet.

When the print order settings are changed by opening the "setting" dialog in FIG. 6 by a user operation with respect to the "setting" item in the "file" menu 2024 described using FIG. 2, the display contents of the print preview display area 9004 are updated according to the changed print order settings.

Reference numeral 9005 denotes a print list display area. The print list display area 9005 displays a list of thumbnails of previews of all output results to be paired with page numbers when image files designated as images to be printed on the first tab are to be printed in the print order displayed in the print order display field 10002 of folders and the print order display field 10004 of images in FIG. 6 in accordance with the settings made in the printer name display field 8001, paper size display area 8003, media type display area 8004, and layout display area 9001. When the number of pages to be output is large and cannot fall within the print list display area 9005, scroll display is made in the right-and-left direction. The display contents of the print list display area 9005 are scrolled in accordance with an operation of a scroll bar 9006 via the mouse 1013 by the user.

When the print order settings are changed by opening the "setting" dialog in FIG. 6 by a user operation with respect to the "setting" item in the "file" menu 2024 described using FIG. 2, the display contents of the print list display area 9005 are updated according to the changed print order settings.

In the print list display area 9005, a page displayed on the print preview display area 9004 is highlighted by cross-hatching. FIG. 16 shows that the preview of the output result of the first page is displayed on the print preview display area 9004.

When the user designates an arbitrary page in the print list display area 9005 and clicks the button of the mouse 1013, the designated page is highlighted in the print list display area 9005. Also, the print preview display area 9004 updates its display contents by a preview of the output result of the designated page.

Reference numeral 9007 denotes a "previous page" button. When the user places the mouse cursor at the position of the "previous page" button 9007 by operating the mouse 1013 and clicks the mouse button there, a page immediately before the page currently highlighted in the print list display area 9005 is highlighted, and a preview of the output result of the newly highlighted page is displayed on the print preview display area 9004. When the first page is highlighted in the print list display area 9005, the "previous page" button 9007 is displayed in an inactive state, and no processing is made in response to a user operation.

Reference numeral 9008 denotes a "next page" button. When the user places the mouse cursor at the position of the "next page" button 9008 by operating the mouse 1013 and clicks the mouse button there, a page next to the page currently highlighted in the print list display area 9005 is highlighted, and a preview of the output result of the newly highlighted page is displayed on the print preview display area 9004. When the last page is highlighted in the print list display area 9005, the "next page" button 9008 is displayed in an inactive state, and no processing is made in response to a user operation.

Reference numeral 9009 denotes a "print" button. When the user designates the "print" button 9009 and clicks the button of the mouse 1013, all image files designated as images to be printed on the first tab are printed from the printer 1014 in the print order displayed in the print order display field 10002 of folders and the print order display field 10004 of images in FIG. 6 in accordance with the settings made in the printer name display field 8001, paper size display area 8003, media type display area 8004, and layout display area 9001.

The print order upon printing images in a plurality of different folders will be described below using FIG. 4.

Figure 4:
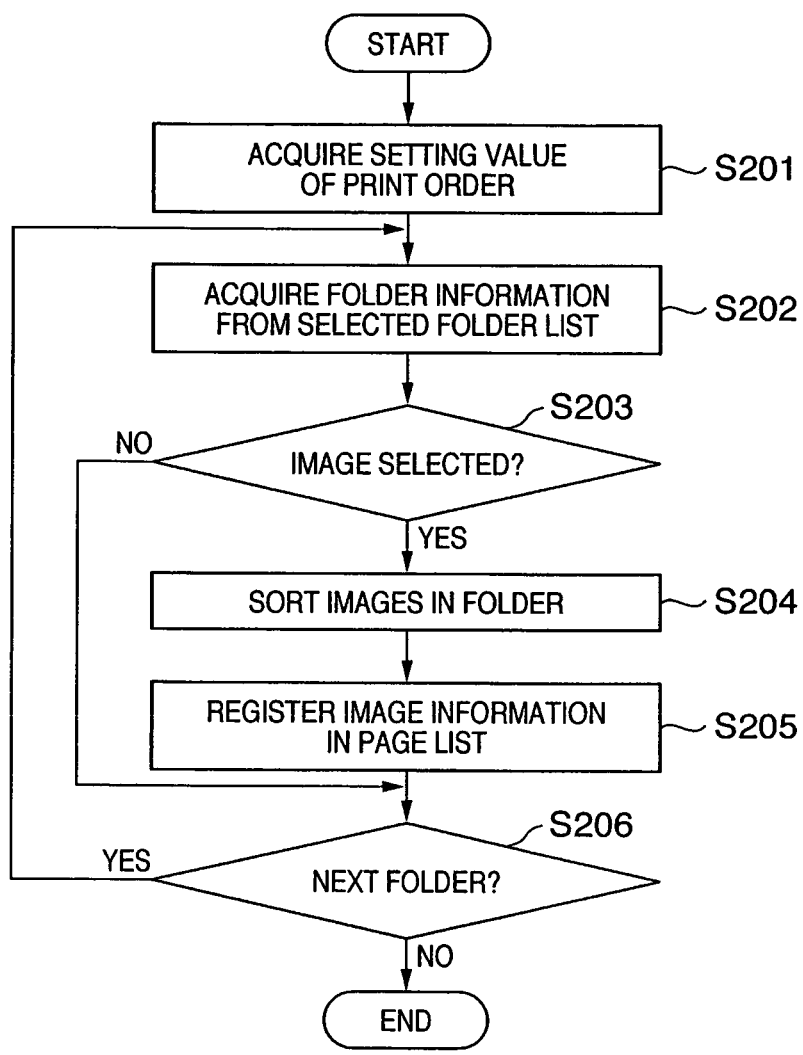
FIG. 4 is a flowchart of processing for registering information associated with an image selected as an image to be printed in a page list.

FIG. 4 is a flowchart of processing for registering information associated with an image to be selected as an image to be printed in a page list (to be described later).

Since preview must be done, upon shifting to the third tab 2003 in FIG. 2, the print order of selected image files is determined and the program holds information of already sorted images as a page list if image files are not printed in practice. Therefore, the processing according to the flowchart in FIG. 4 must be executed prior to the third tab processing.

In step S201, one of "name order", "date & time order", and "selection order" as the print order of images in FIG. 6 (the contents displayed in the print order display field 10004) is acquired.

In step S202, the location information (full-path name) of the oldest folder registered in the folder list is acquired. This is because the print order of folders set in the "setting" dialog in FIG. 6 is "selection order" as a default value.

It is checked in step S203 if the folder specified by the location information acquired in step S202 includes image files selected as images to be printed. This checking processing is attained by checking with reference to the folder list whether or not a link corresponding to the location information acquired in step S202 exists. If the corresponding link exists, it is determined that this folder includes image files selected as images to be printed.

If the folder specified by the location information acquired in step S202 includes image files selected as images to be printed, the flow advances to step S204 and the selected image files are sorted according to the print order acquired in step S201. More specifically, the selected image files are sorted in practice according to the print order acquired in step S201 by sorting file names registered in the file list indicated by the link corresponding to the location information acquired in step S202.

In step S205, the sorted result is registered as image information in a list called a page list as a source for creating a print page so as to be used to preview an image of the print page on the third tab 2003 in FIG. 2 and used to print that image. Note that the image information that can be applied is not limited to such list which describes file names. For example, a list which describes identification codes (e.g., IDs) assigned to respective images on the apparatus side may be used, and various other configurations may be used.

More specifically, the file names of the selected image files sorted in step S204 are referred to in turn from the first one, and pointers (image information) each of which indicates an address on a memory where the selected image file of the referred file name and information (the file name, photographing date and time, and the like of the selected image file) associated with this image file are sequentially registered in the page list.

It is checked in step S206 if the location information of the next folder exists in the folder list. If such location information exists, the flow returns to step S202 to repeat the subsequent processing for the next oldest folder. If no such location information exists, this processing ends.

Figure 5:
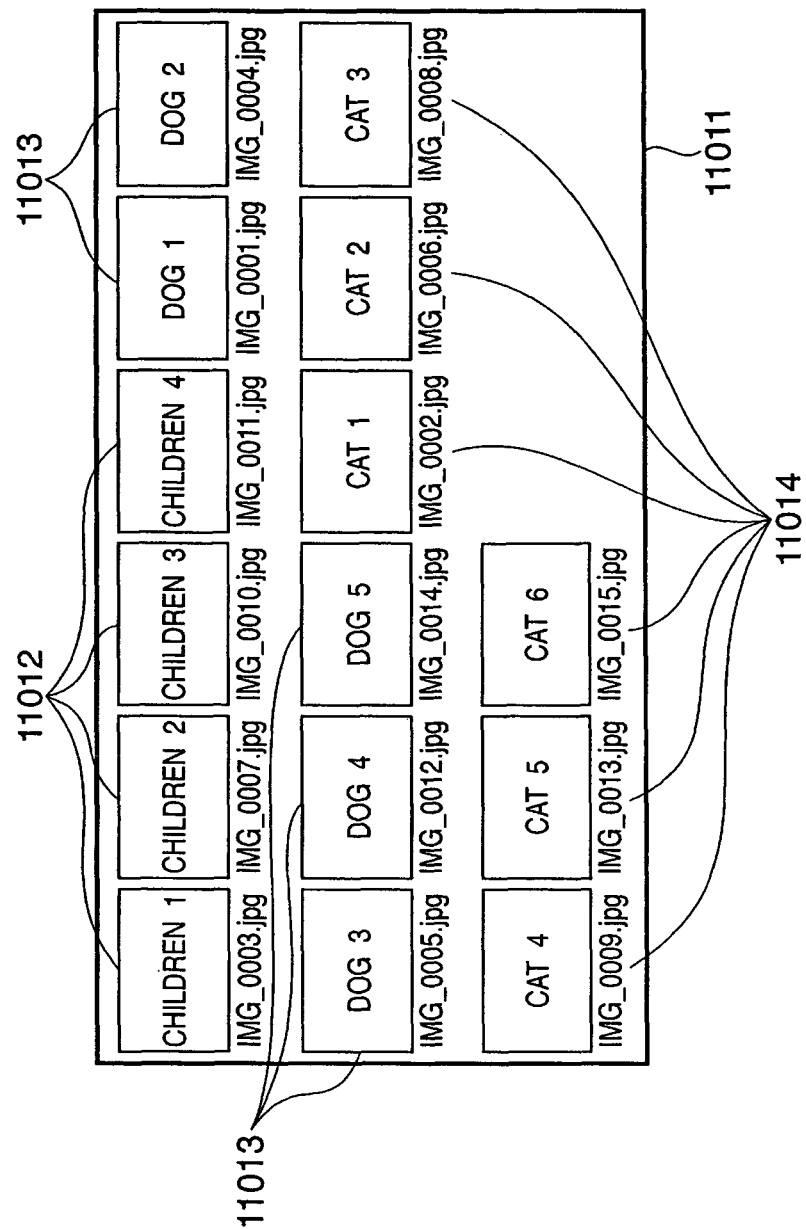
FIG. 5 shows an output example of images in a plurality of folders printed on one paper sheet.
Figure 17:
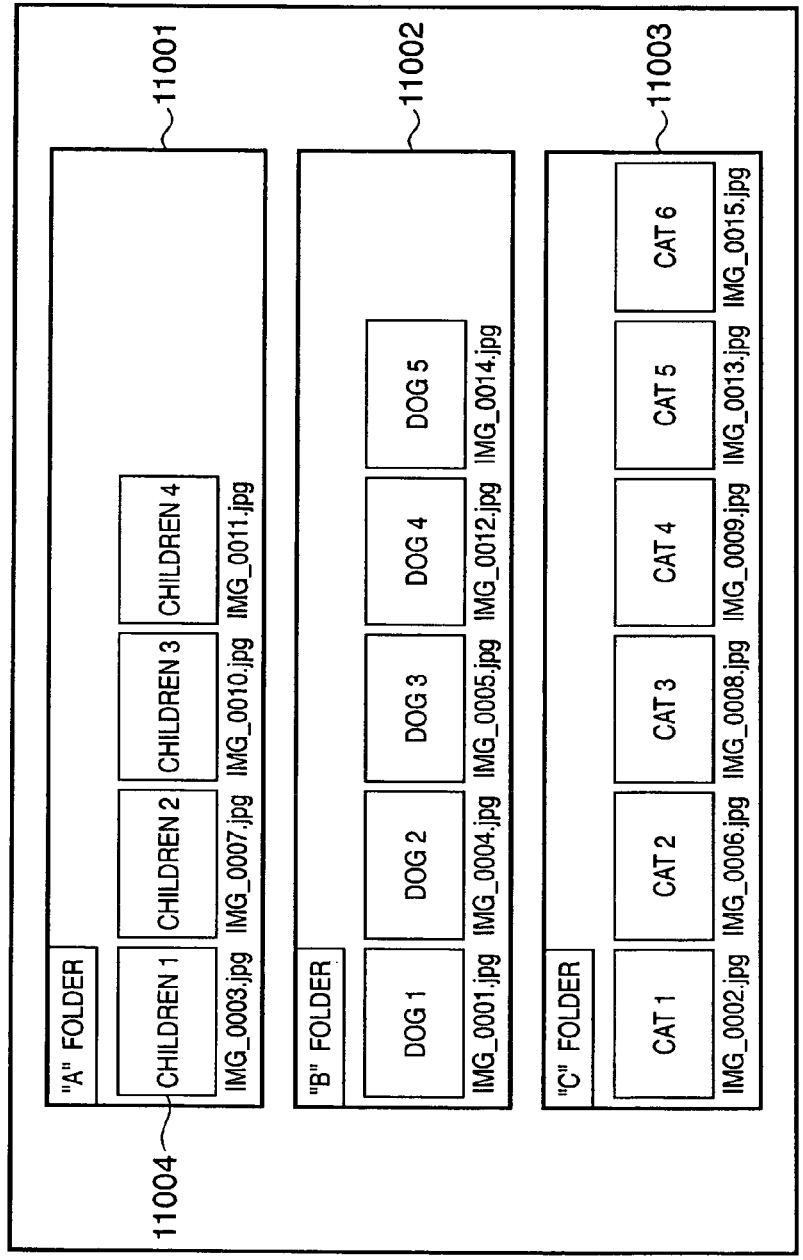
FIG. 17 illustrates an example of folders in a hard disk (HDD) of a computer and image files included in these folders.

After all image files held by the folders shown in FIG. 17 are selected as images to be printed, and the print order of images is set as "name order", when the processing according to the flowchart shown in FIG. 4 is executed, a page list used to print a total of 15 image files respectively held by the "A" folder 11001, "B" folder 11002, and "C" folder 11003 on one paper sheet 11011, is generated, as shown in FIG. 5.

Furthermore, these image files are sorted so that images 11012 in the "A" folder 11001 as the first folder selected by the user are laid out at the head of the list. These four images 11012 are sorted in the name order, as designated in the print order display field 10004 of images on the "setting" dialog.

Images 11013 in the "B" folder 11002 are laid out after the images 11012 in the "A" folder 11001. These file images 11013 are also sorted in the name order. After these images, six images 11014 in the "C" folder are laid out while being sorted in the name order.

Note that the flowchart in FIG. 4 is executed when all images are to be printed on a paper sheet of one page. When images are to be printed on a plurality of pages, page lists are created for respective pages.

For example, when an Nin1 print operation is done for M pages, respective pieces of image information are sequentially registered in one-page list, as described above. After N pieces of image information of N image files are registered, next image information is registered in the next page list. In this way, M page lists are created. The same applies to the flowcharts shown in FIGS. 7 and 8 to be described later.

Upon executing previewing or printing, the plurality of pieces of image information registered in the page list are referred to in turn from the first information, and a thumbnail or print data is generated based on the referred image information, thus making a preview output (to output thumbnail data generated in the order of image information registered in the page list to the display device 1011) or a print output (to output print data generated in the order of image information registered in the page list to the printer 1014).

The effect that printing can be done in the print order according to a user request by providing means for prompting the user to select whether or not to sort images for each folder, and means for setting the print order for each folder when images are sorted for each folder will be described below using FIG. 7.

Figure 7:
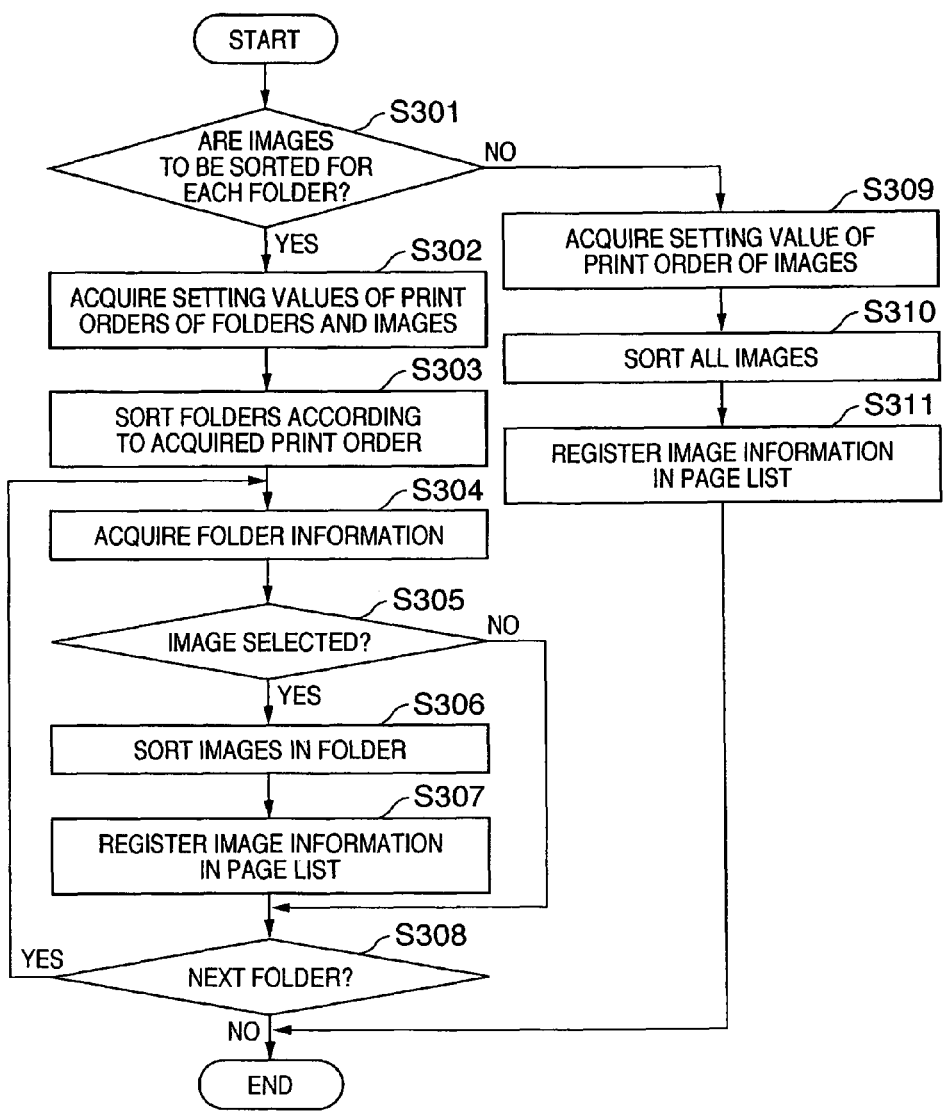
FIG. 7 is a flowchart of processing for determining the print order of images when the dialog shown in FIG. 6 has means 10008 used to switch whether or not images are sorted for each folder.

FIG. 7 is a flowchart of processing for determining the print order of images when the aforementioned dialog in FIG. 6 has the means 10008 for switching whether or not to sort images for each folder. Note that the processing according to the flowchart of FIG. 7 must be executed prior to the third tab processing as in the flowchart of FIG. 4.

It is checked in step S301 if the check box 10008 in FIG. 6 is checked (to determine if images are to be sorted for each folder, or images are to be sorted together regardless of folders). If images are to be sorted for each folder, one of "name order", "date & time order", and "selection order" as the print order 10002 of folders and one of "name order", "date & time order", and "selection order" as the print order 10004 of images in FIG. 6 are acquired in step S302.

In step S303, respective pieces of location information of folders registered in the folder list are sorted according to the print order of folders (the setting displayed in the print order display field 10002 of folders) acquired in step S302 (this processing is equivalent to sorting folders in practice).

In step S304, the first one of the sorted location information is acquired.

It is checked in step S305 if image files selected as images to be printed exist in the folder specified by the location information acquired in step S304. This checking processing is done in the same manner as in step S203.

As a result of checking, if selected image files exist, the flow advances to step S306, and these selected image files are sorted according to the print order acquired in step S302.

In step S307, the sorted result is registered as image information in a list called a page list as a source for creating a print page so as to be used to preview an image of the print page on the third tab 2003 in FIG. 2 and used to print that image.

The processes in steps S306 and S307 are executed in the same manner as in steps S204 and S205.

It is then checked in step S308 if the next one of the sorted location information exists. If such location information exists, the flow returns to step S304 to repeat the subsequent processing for a folder specified by the next location information. On the other hand, if no such location information exists, this processing ends.

On the other hand, if the checking result in step S301 indicates that images are to be sorted together regardless of folders, one of setting values "name order", "date & time order", and "selection order" as the print order 10004 of images in FIG. 6 is acquired in step S309, and all images are simultaneously sorted based on the acquired setting value in step S310.

In step S311, respective pieces of image information are registered in a page list for the purpose of the print preview processing on the third tab 2003 in FIG. 2 and actual print processing, thus ending this processing.

In this embodiment, since the print order of folders can be set on the "setting" dialog in addition to that of images, images can be printed in the order according to the intention of the user in the "multi-folder mode".

In this embodiment, three types of orders "date & time order", "name order", and "section order" are displayed as options of the print order display field 10002 of folders on the "setting" dialog in FIG. 6. Alternatively, some of these options may be excluded or options other than those described above may be included.

When the check box "sort images for each folder" is unchecked, image files are not handled for each folder, and all images set as those to be printed are simultaneously sorted in the print order displayed in the print order display field 10004 of images, thus allowing to switch from the setting for sorting images for each folder.

FIG. 18 shows the print result when images held by respective folders exemplified in FIG. 17 are printed by a method of unchecking a check box "sort images for each folder". Note that FIG. 18 shows an example when the print order display field 10004 of images on the "setting" dialog is "name order".

The effect that printing can be done in the print order according to a user request by providing means that can insert delimitation data between neighboring folders upon sorting images for each folder will be described below using FIG. 8.

Figure 8:
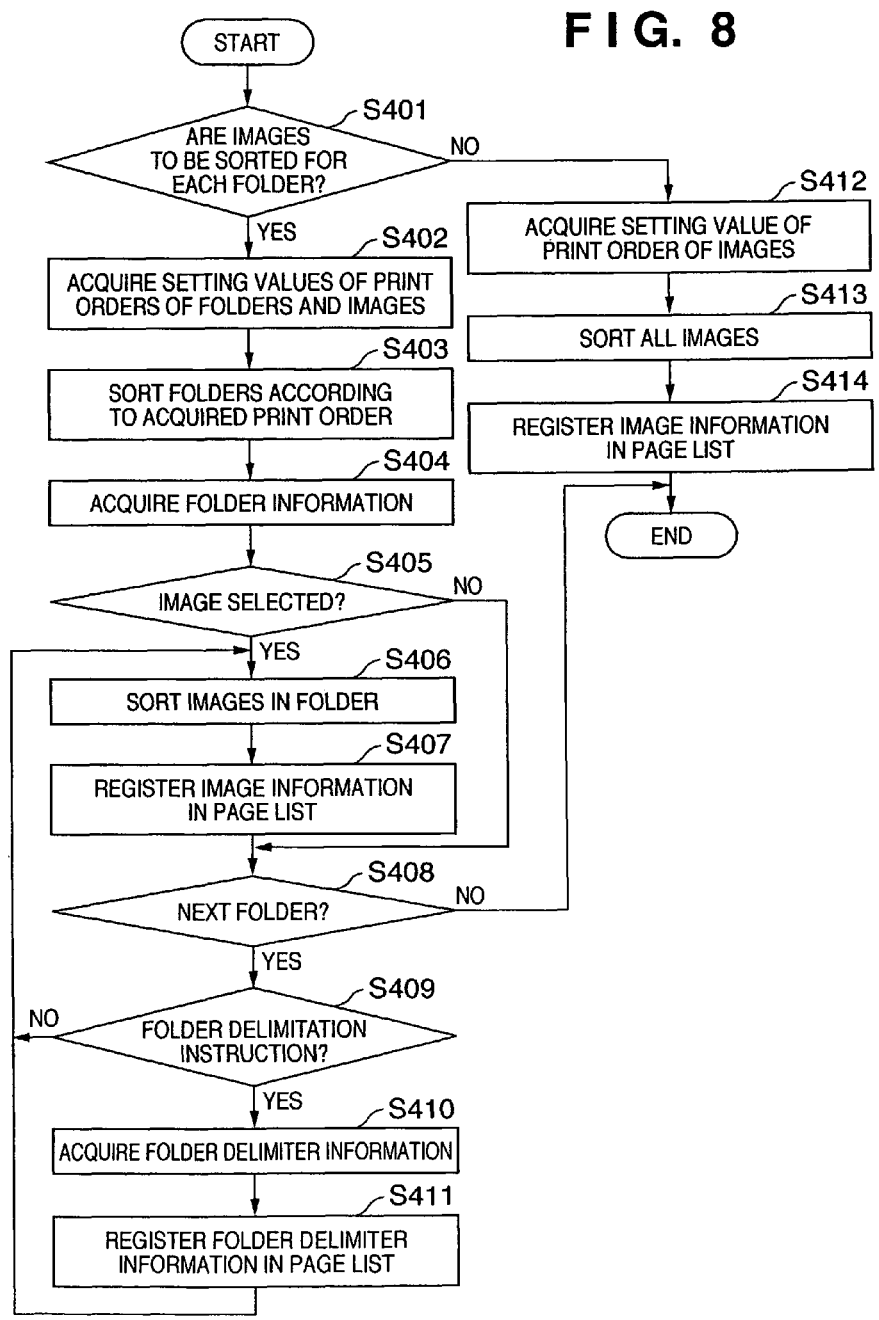
FIG. 8 is a flowchart until the print order of images is determined when means that can insert print data between neighboring folders is provided upon sorting images for each folder.

FIG. 8 is a flowchart of processing until the print order of images is determined when means that can insert print data between neighboring folders is provided upon sorting images for each folder. Note that the processing according to the flowchart of FIG. 8 must be executed prior to the third tab processing as in the flowchart of FIG. 4.

It is checked in step S401 if the check box 10008 in FIG. 6 is checked (to determine if images are to be sorted for each folder, or images are to be sorted together regardless of folders). If images are to be sorted for each folder, one of "name order", "date & time order", and "selection order" as the print order 10002 of folders and one of "name order", "date & time order", and "selection order" as the print order 10004 of images in FIG. 6 are acquired in step S402.

In step S403, respective pieces of location information of folders registered in the folder list are sorted according to the print order of folders (the setting displayed in the print order display field 10002 of folders) acquired in step S402.

In step S404, the first one of the sorted location information is acquired.

It is checked in step S405 if image files selected as images to be printed exist in the folder specified by the location information acquired in step S404. This checking processing is done in the same manner as in step S203.

As a result of checking, if selected image files exist, the flow advances to step S406, and these selected image files are sorted according to the print order acquired in step S402.

In step S407, the sorted result is registered as image information in a list called a page list as a source for creating a print page so as to be used to preview an image of the print page on the third tab 2003 in FIG. 2 and used to print that image.

The processes in steps S406 and S407 are executed in the same manner as in steps S204 and S205.

It is then checked in step S408 if the next one of the sorted location information exists. If such location information exists, it is checked in step S409 if a delimitation setting instruction between neighboring folders is set. Such instruction can be set in advance using a GUI.

If the delimitation setting instruction is set, folder delimitation information is acquired in step S410, and that information is registered in the page list which is referred to upon actual printing in step S411, thus reflecting the folder delimitation in printing. For example, all pieces of image information for all selected image file in a given folder, delimitation information, all pieces of image information for all selected image file in another folder, delimitation information, . . . are registered in the page list. In this manner, when printing or preview processing is done in the order according to this page list, and when this delimitation information is referred to, various kinds of delimitation processing to be described later are executed.

The flow returns to step S406 to repeat the subsequent processing for the next folder.

If it is determined in step S408 that no next folder exists, this processing ends.

On the other hand, if the setting determined in step S401 indicates that images are to be sorted together regardless of folders, one of setting values "name order", "date & time order", and "selection order" as the print order 10004 of images in FIG. 6 is acquired in step S412, and all images are simultaneously sorted based on the acquired setting value in step S413.

In step S414, respective pieces of image information are registered in a page list for the purpose of the print preview processing on the third tab 2003 in FIG. 2 and actual print processing, thus ending this processing.

FIG. 9 shows an output example when line feed data is inserted as a folder delimiter. Images included in the first folder are printed at the head of a paper sheet, and a new line is started. From the head of the new line, images included in the second folder are printed. After that, line feed data is inserted at the position corresponding to a folder delimiter. In this way, folder delimitation is easily recognized.

Figure 10:
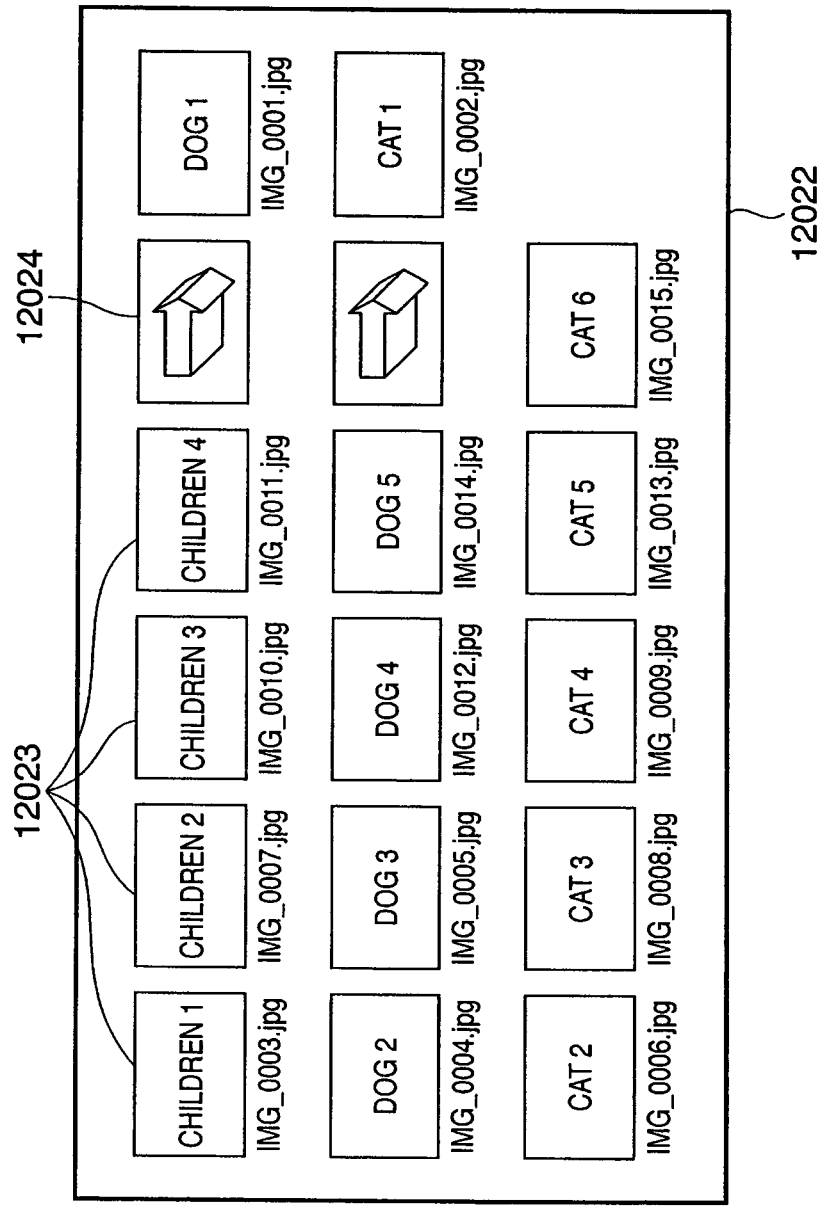
FIG. 10 shows an output example when image data is inserted as a folder delimiter.

FIG. 10 shows an output example when image data is inserted as a folder delimiter. Images 12023 included in the first folder are printed at the head of a paper sheet 12022, and a delimiter image 12024 is printed after these images. After the delimiter image, images included in the second folder are printed. After that, the delimiter image 12024 is inserted at the position corresponding to a folder delimiter. The delimiter image 12024 may be printed before the images 12023 included in the first folder.

FIG. 11 shows an output example when page break data is inserted as a folder delimiter. On a paper sheet 12019 of the first page, images selected by the user in a folder which becomes the first one according to the sorting rule displayed in the print order display field 10002 of folders on the "setting" dialog in FIG. 6 are sorted by the method displayed in the print order display field 10004 of images, and the sorted images are printed. A new page is started before images included in the next folder. Then, images included in the second folder are sorted and printed on a paper sheet 12020 of the second page. Likewise, images included in the third folder are printed on a paper sheet 12021 of the third page.

In addition, a folder name character string of a folder that stores images to be printed next may be printed at the folder delimiter position, or a header page may be printed. With these methods, when images are classified in folders in correspondence with their types, the user can easily classify prints as the output result.

However, in these cases, since images selected from different folders cannot be printed on a single paper sheet, the following arrangement may be preferably adopted. That is, a new setting item may be provided to, e.g., the "setting" dialog, and page break data or delimiter image data may be inserted according to the setting value of this new setting item, or both "layout with delimiter" and "layout without delimiter" may be displayed as options on the layout display field 9001 in FIG. 16, and page break data or delimiter image data may be inserted only when "layout with delimiter" is selected.

In this embodiment, the case in which the selected folder list 7007 in FIG. 14 is used as the method of simultaneously selecting images included in a plurality of different folders has been exemplified. However, as the selection method of images in a storage device, an image selection window shown in FIG. 19 may be used. This window visualizes the hierarchical structure of folders together with thumbnails included in these folders.

Figure 19:
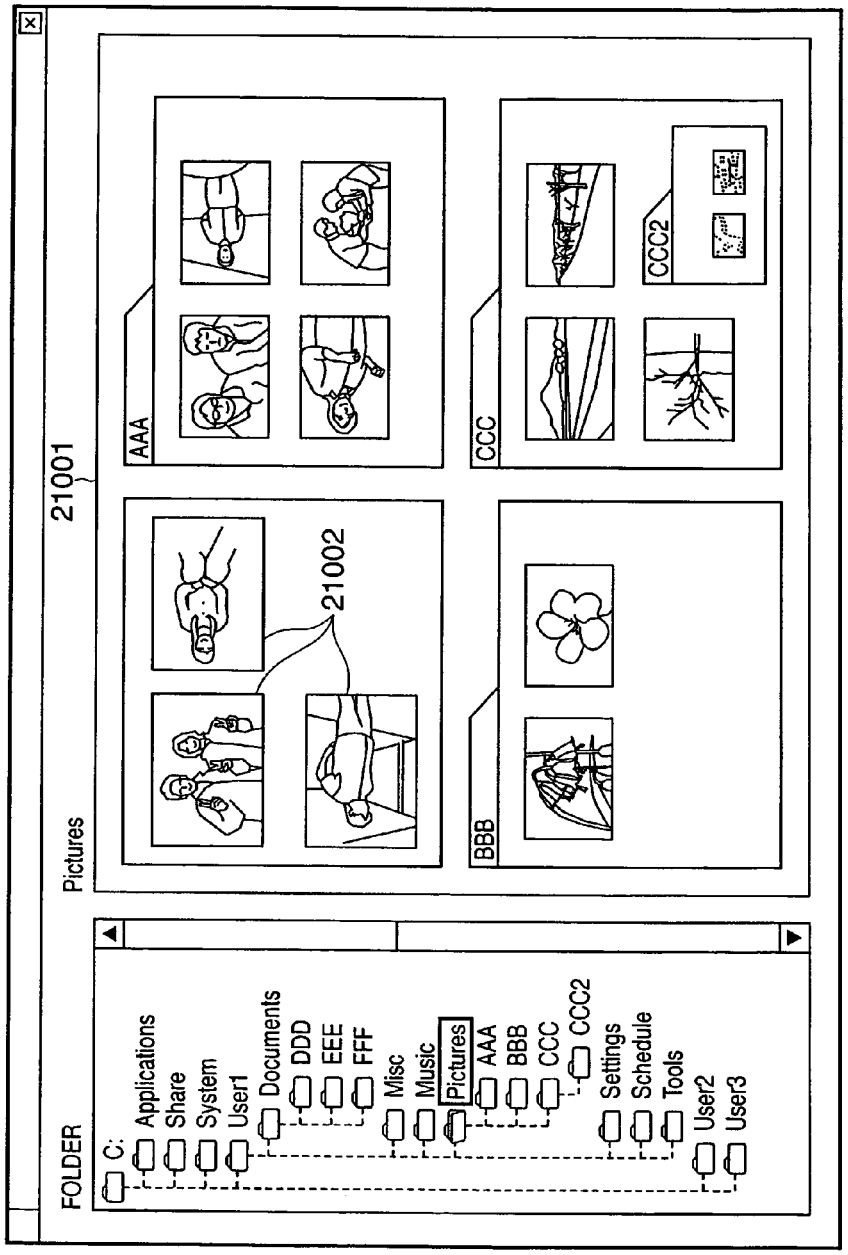
FIG. 19 shows an example of a conventional hierarchical data display method.

In the example of FIG. 19, a thumbnail display area 21001 displays the contents of a folder "Pictures". This folder "Pictures" directly includes three image files 21002, and also include three folders "AAA", "BBB", and "CCC", which also store image files.

The folder "CCC" further includes a folder "CCC2", which also stores image files.

In the thumbnail display area 21001, image files are displayed as thumbnails. At this time, in order to allow easy understanding of the hierarchical relationship among folders, thumbnails of images stored in a higher-order folder are displayed in a larger size, and those of images stored in a lower-order folder are displayed in a smaller size.

Figure 20:
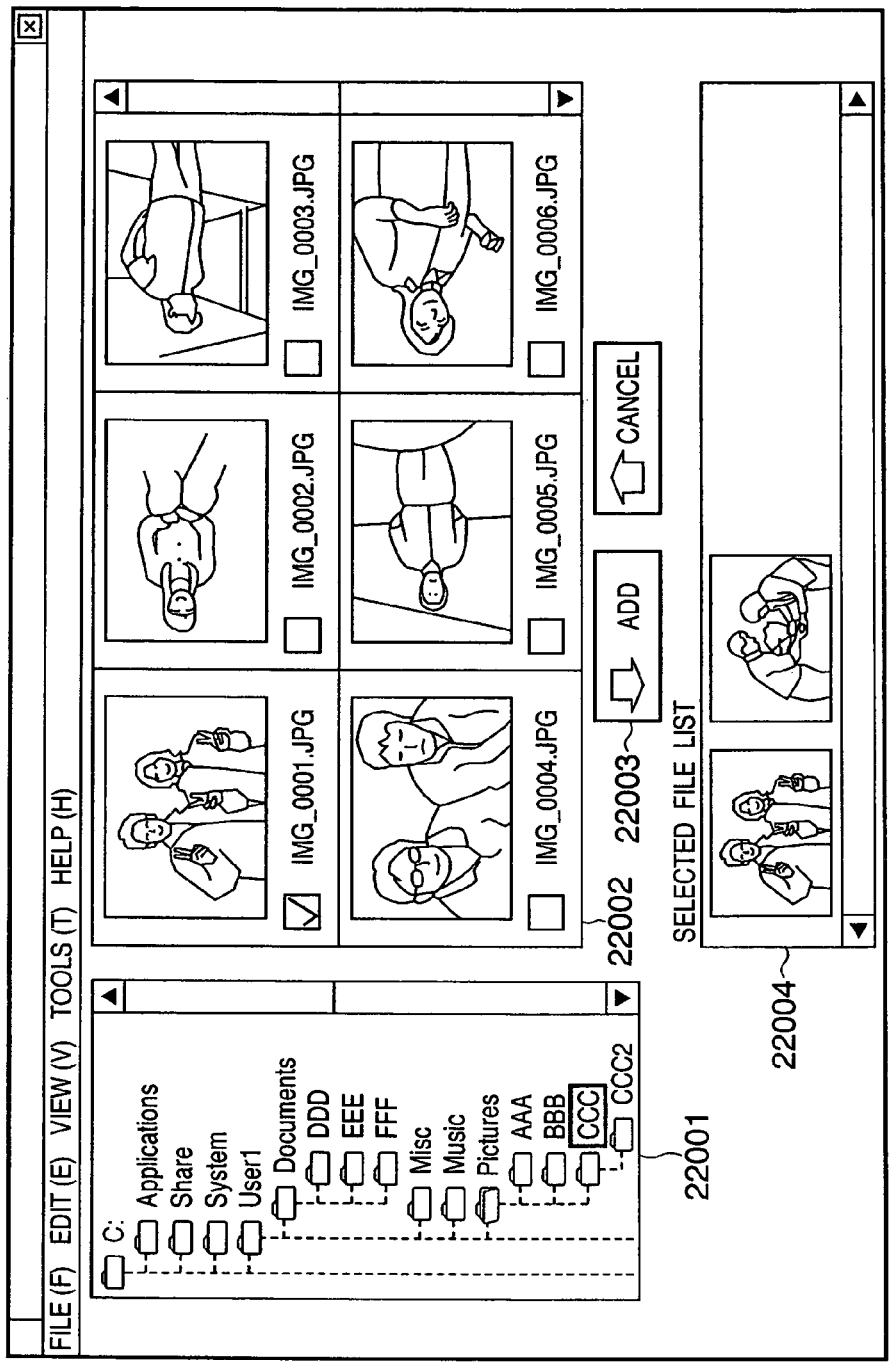
FIG. 20 shows an example of a conventional print image selection method.

Also, as shown in FIG. 20, thumbnails of image files included in a folder selected on a folder tree display area 22001 may be selected as a list on a thumbnail display area 22002. After the thumbnail is selected (by assigning a check mark in FIG. 20), the user clicks an "add" button 22003 to register an image corresponding to the selected thumbnail in a "selected file list" 22004.

As described above, according to this embodiment, when images in a plurality of different folders are to be printed at the same time, the print order can be set for each folder, and the print result according to the intention of the user can be provided.

Note that this embodiment uses image files as an example of data files to be printed. However, the present invention is not limited to such specific data files to be printed, and document files and other kinds of files may be used.

In the above description, the configuration and operation method of the GUIs are not limited to those described above, and various modifications may be made.

[Other Embodiments]

Figure 21:
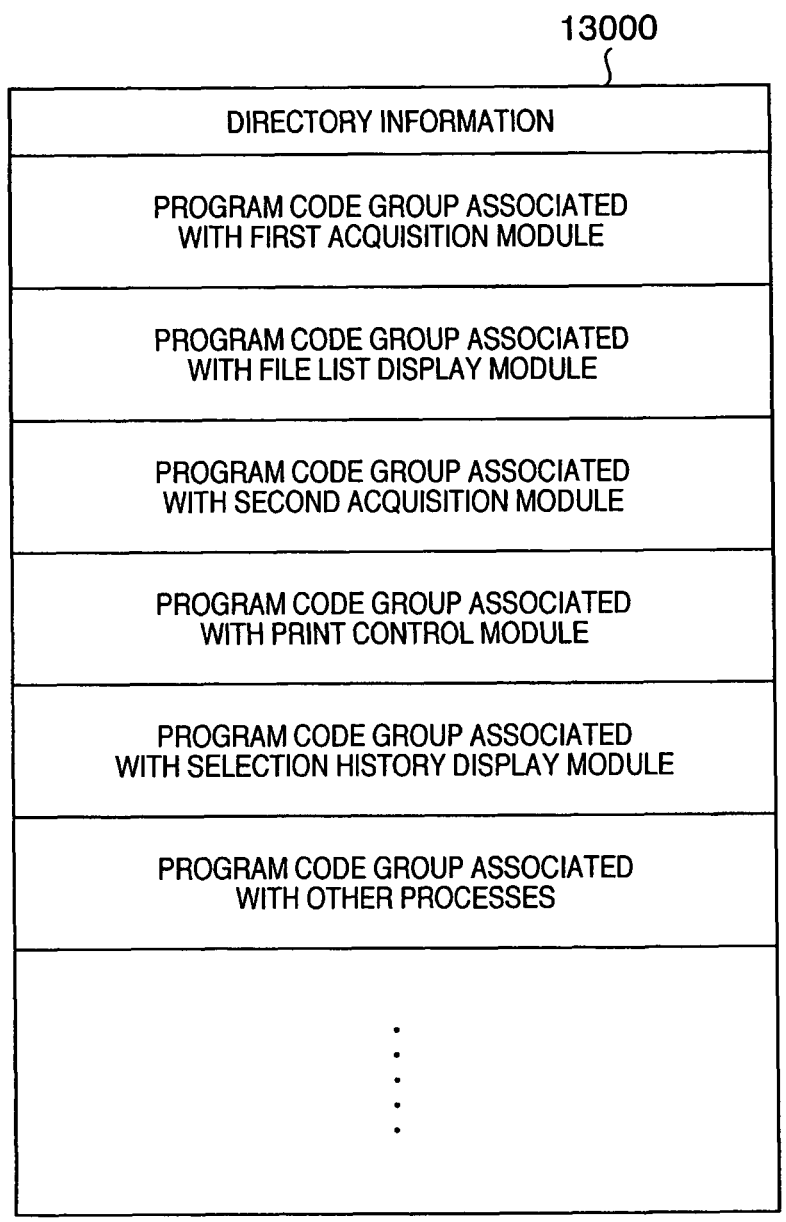
FIG. 21 shows the memory map on a storage medium according to the second embodiment of the present invention.

FIG. 21 shows the memory map of a storage medium according to the second embodiment.

A storage medium 13000 according to this embodiment comprises a CD-ROM, DVD-ROM, or the like which stores various programs (program code groups), as shown in FIG. 21. Data which correspond to various programs are managed in predetermined directories on the storage medium 13000.

The storage medium 13000 also stores information used to manage the programs, e.g., version information, information associated with a creator, and the like. Furthermore, the storage medium 13000 may store information depending on an OS on the program reading side such as icons used to identifiably display programs and the like. Moreover, the storage medium 13000 may store a program used to install various programs in a computer and a program used to decompress a program when the program to be installed is compressed.

The objects of the present invention are also achieved by supplying a storage medium, which records a program code of a software program that can implement the functions of the first embodiment to a system or apparatus, and reading out and executing the program code stored in the storage medium by a computer (or a CPU or MPU) of the system or apparatus.

In this case, the program code itself read out from the storage medium implements the functions of the first embodiment, and the storage medium which stores the program code constitutes the present invention.

As the storage medium for supplying the program code, for example, a floppy® disk, hard disk, magneto-optical disk, CD-ROM, CD-R, CD-RW, DVD-ROM, DVD-RAM, DVD-RW, DVD+RW, magnetic tape, nonvolatile memory card, ROM, and the like may be used. Or the program code may be downloaded via a network.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-179648, filed Jun. 20, 2005, which is hereby incorporated by reference herein in its entirety.

What is claimed is:

1. A data processing apparatus, comprising:
   a specifying unit that specifies folders each including one or more images;
   an inputting unit that inputs a first condition designated by a user for determining a folder order of the folders specified by the specifying unit, and a second condition designated by a user for determining an image order of the one or more images included in each of the folders;
   a storage unit that stores, in a memory, information used to specify each of the folders specified by the specifying unit and to specify one or more images included in each of the folders;
   a determining unit that determines the folder order of the folders according to the first condition input by the inputting unit, and determines the image order of the one or more images included in each of the folders according to the second condition input by the inputting unit, wherein the determining unit determines the folder order and the image order by specifying each of the folders and the one or more images included in each of the folders based on the information stored in the storage unit;
   a print control unit configured to cause a printer to print images included in the folders according to the folder order and the image order, so that the images included in the folders are arranged on one or more pages in units of the folders which are ordered according to the folder order and so that the one or more images included in each of the folders are arranged in the image order; and
   at least one processor configured to function as at least one of the specifying unit, the inputting unit, the storage unit, the determining unit, and the print control unit.

2. A data processing method to be executed by a print control apparatus, comprising:
   a specifying step of specifying folders each including one or more images;
   an inputting step of inputting a first condition designated by a user for determining a folder order of the folders specified in the specifying step, and a second condition designated by a user for determining an image order of the one or more images included in each of the folders;
   a storage step of storing information used to specify each of the folders specified by the specifying step and to specify one or more images included in each of the folders;
   a determining step of determining the folder order of the folders according to the first condition input in the inputting step, and determining the image order of the one or more images included in each of the folders according to the second condition input in the inputting step, wherein the determining step determines the folder order and the image order by specifying each of the folders and the one or more images included in each of the folders based on the information stored in the storage step; and
   a print control step of causing a printer to print images included in the folders according to the folder order and the image order, so that the images included in the folders are arranged on one or more pages in units of the folders which are ordered according to the folder order and so that the one or more images included in each of the folders are arranged in the image order.

3. A non-transitory computer readable storage medium storing a program for causing a computer to execute the data processing method according to claim 2.

4. The apparatus according to claim 1, wherein said print control unit causes the printer to print the images included in the folders so that the images included in the folders are arranged on a same page and are arranged in units of the folders.

5. The apparatus according to claim 1, wherein said print control unit causes the printer to print the images included in the folders so that the one or more images included in each of the folders are arranged on different pages in units of the folders.

6. The method according to claim 2, wherein in the print control step the printer is caused to print the images included in the folders so that the images included in the folders are arranged on a same page and are arranged in units of the folders.

7. The method according to claim 2, wherein in the print control step the printer is caused to print the images included in the folders so that the one or more images included in each of the folders are arranged on different pages in units of the folders.

8. The apparatus according to claim 1, wherein
   the determining unit sorts the folders in accordance with the determined folder order, and then
   determines the image order of the one or more images included in each of the sorted folders based on the second condition.

9. The apparatus according to claim 1, further comprising a selection unit that individually selects the one or more images from one or more folders of a plurality of folders in accordance with an instruction by a user,
   wherein the specifying unit specifies the folders, among the plurality of folders, in which the one or more images are selected by the selection unit.

10. The method according to claim 2, wherein
    the determining step sorts the folders in accordance with the determined folder order, and then
    determines the image order of the one or more images included in each of the sorted folders based on the second condition.

11. The method according to claim 2, further comprising a selection step for individually selecting the one or more images from one or more folders of a plurality of folders in accordance with an instruction by a user,
 wherein the specifying step specifies the folders, among the plurality of folders, in which the one or more images are selected by the selection step.

* * * * *